(12) United States Patent
Ise et al.

(10) Patent No.: US 10,361,429 B2
(45) Date of Patent: Jul. 23, 2019

(54) ACTIVE SUBSTANCE USED FOR NONAQUEOUS ELECTROLYTE BATTERY

(71) Applicant: KABUSHIKI KAISHA TOSHIBA, Minato-ku (JP)

(72) Inventors: Kazuki Ise, Fuchu (JP); Yasuhiro Harada, Yokohama (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/202,844

(22) Filed: Mar. 10, 2014

(65) Prior Publication Data
US 2014/0295231 A1 Oct. 2, 2014

(30) Foreign Application Priority Data

Mar. 26, 2013 (JP) .................................. 2013-065040
Mar. 7, 2014 (JP) .................................. 2014-045366

(51) Int. Cl.
*H01M 4/485* (2010.01)
*H01M 10/48* (2006.01)
(Continued)

(52) U.S. Cl.
CPC ............. *H01M 4/485* (2013.01); *B82Y 30/00* (2013.01); *C01G 33/00* (2013.01); *C01G 33/006* (2013.01);
(Continued)

(58) Field of Classification Search
None
See application file for complete search history.

(56) References Cited

U.S. PATENT DOCUMENTS

| 2012/0052401 A1* | 3/2012 | Goodenough ........ C01G 33/00 429/341 |
| 2012/0107692 A1 | 5/2012 | Harada et al. |
| 2012/0244442 A1 | 9/2012 | Harada et al. |

FOREIGN PATENT DOCUMENTS

| CN | 102479950 A * | 5/2012 | ............. H01M 4/48 |
| CN | 102544466 A | 7/2012 | |

(Continued)

OTHER PUBLICATIONS

Lu et al., "Atomic-scale investigation on lithium storage mechanism in TiNb2O7", Energy Environ. Sci., 2011, 4, 2638.*
(Continued)

*Primary Examiner* — Barbara L Gilliam
*Assistant Examiner* — Zhongqing Wei
(74) *Attorney, Agent, or Firm* — Oblon, McClelland, Maier & Neustadt, L.L.P.

(57) ABSTRACT

According to one embodiment, there is provided an active substance. The active substance contains active material particles. The active material particles comprise a compound represented by the formula: $Ti_{1-x}M1_xNb_{2-y}M2_yO_7$. The active material particles has a peak A attributed to a (110) plane which appears at 2θ ranging from 23.74 to 24.14°, a peak B attributed to a (003) plane which appears at 2θ ranging from 25.81 to 26.21° and a peak C attributed to a ($\bar{6}$02) plane which appears at 2θ ranging from 26.14 to 26.54° in an X-ray diffraction pattern of the active material particles. An intensity $I_A$ of the peak A, an intensity $I_B$ of the peak B, and an intensity $I_C$ of the peak C satisfy the relation (1): $0.80 \leq I_B/I_A \leq 1.12$; and the relation (2) $I_C/I_B \leq 0.80$.

23 Claims, 11 Drawing Sheets

(51) Int. Cl.
| | |
|---|---|
| H01M 4/525 | (2010.01) |
| H01M 10/0525 | (2010.01) |
| H01M 4/62 | (2006.01) |
| H01M 4/36 | (2006.01) |
| C01G 33/00 | (2006.01) |
| C01G 35/00 | (2006.01) |
| C01G 39/00 | (2006.01) |
| C01G 49/00 | (2006.01) |
| B82Y 30/00 | (2011.01) |

(52) U.S. Cl.
CPC ......... *C01G 35/006* (2013.01); *C01G 39/006* (2013.01); *C01G 49/0018* (2013.01); *H01M 4/366* (2013.01); *H01M 4/525* (2013.01); *H01M 4/625* (2013.01); *H01M 10/0525* (2013.01); *H01M 10/482* (2013.01); *C01P 2002/72* (2013.01); *C01P 2002/74* (2013.01); *C01P 2004/61* (2013.01); *C01P 2004/62* (2013.01); *C01P 2004/64* (2013.01); *C01P 2006/12* (2013.01)

(56) References Cited

FOREIGN PATENT DOCUMENTS

| | | |
|---|---|---|
| CN | 102694160 A | 9/2012 |
| EP | 2 448 054 A1 | 5/2012 |
| EP | 2 503 625 A2 | 9/2012 |
| JP | 2010-510631 A | 4/2010 |
| JP | 2010-287496 | 12/2010 |
| JP | 2012-506361 A | 3/2012 |
| JP | 2012-99287 A | 5/2012 |
| WO | WO 2012/016185 A2 | 2/2012 |

OTHER PUBLICATIONS

Extended European Search Report dated Jul. 21, 2014, in European Patent Application No. 14158621.4.
Xia Lu, et al., Atomic-scale investigation on lithium storage mechanism in $TiNb_2O_7$, Energy & Environmental Science, XP055124833, vol. 4, No. 8, Jan. 1, 2011, pp. 2638-2644.
Madeleine Gasperin, "Affinement de la structure de $TiNb_2O_7$ et repartition des cations", Journal of Solid State Chemistry 53, 1984, 2 pages.
Xia Lu, et al., "Atomic-scale investigation on lithium storage mechanism in $TiNb_2O_7$", Energy & Environmental Science, 4, 2011, 7 pages.
Lucienne Buannic, et al., "Effect of syntheses and post synthetic treatments on mixed titanium niobium oxides for use as negative electrode in high power Li-ion batteries", The $223^{rd}$ ECS Meeting, Abstract #395, 2013, 1 page.
Jian-Tao Han, et al., "New Anode Framework for Rechargeable Lithium Batteries", Chemistry of Materials, 23, 2011, 3 pages.
U.S. Appl. No. 14/203,800, filed Mar. 11, 2014, Yoshima, et al.
Office Action dated Nov. 26, 2015 in Korean Patent Application No. 10-2015-0053360 (with English language translation).
Hansan Liu, et al., "Mesoporous $TiO_2$-B Microspheres with Superior Rate Performance for Lithium Ion Batteries" Advanced Materials, vol. 23, No. 30, Jul. 1, 2011, pp. 3450-3454.
Office Action dated Aug. 21, 2015 in Korean Patent Application No. 10-2014-0029370 (with English language translation).
Combined Chinese Office Action and Search Report dated Nov. 4, 2015 in Chinese Patent Application No. 201410092995.9 (with English language translation).
Japanese Office Action dated Aug. 16, 2016 in Japanese Patent Application No. 2014-045366 (machine translation is provided, but no representation is made as to its accuracy), 4 pages.
Office Action dated Apr. 29, 2016 in Korean Patent Application No. 10-2014-0029370.
Second Chinese Office Action dated Jun. 3, 2016 in Chinese Application No. 2014100929959 with English translation, 18 pages.

* cited by examiner

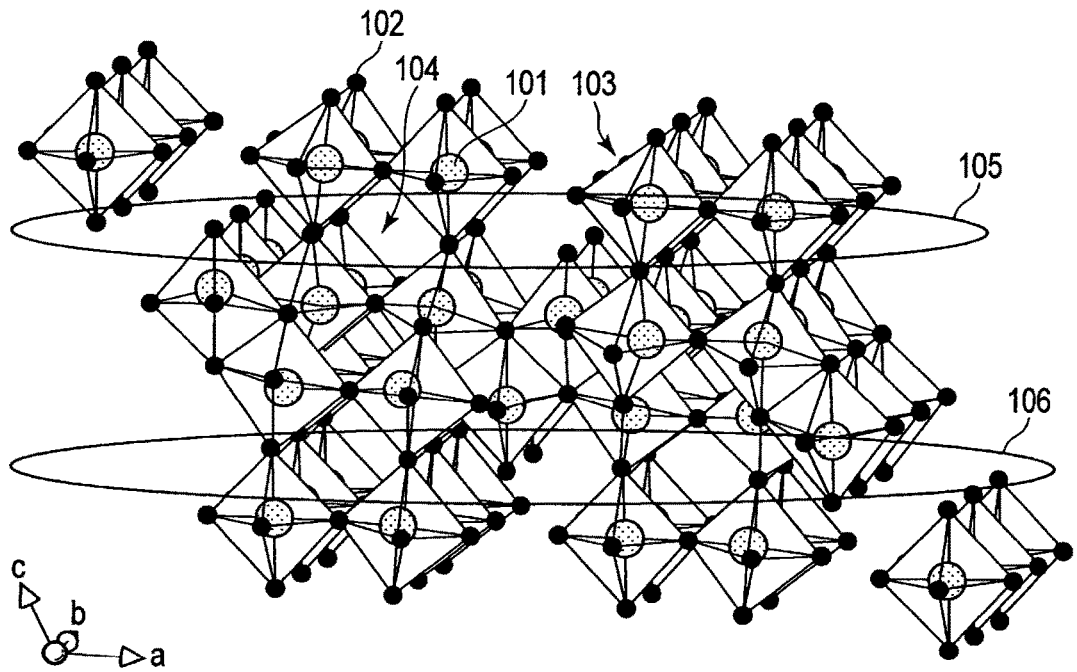
F I G. 1
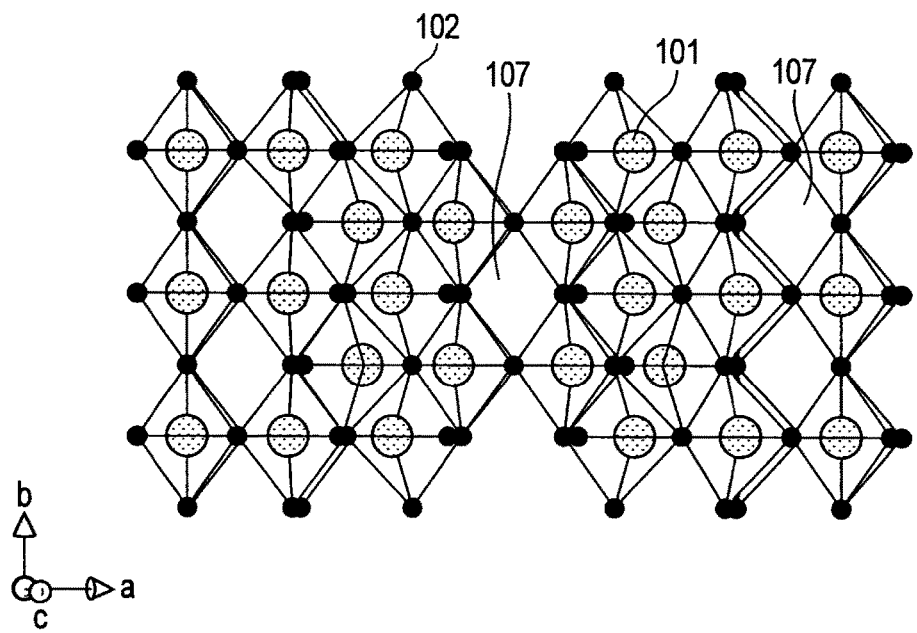
F I G. 2

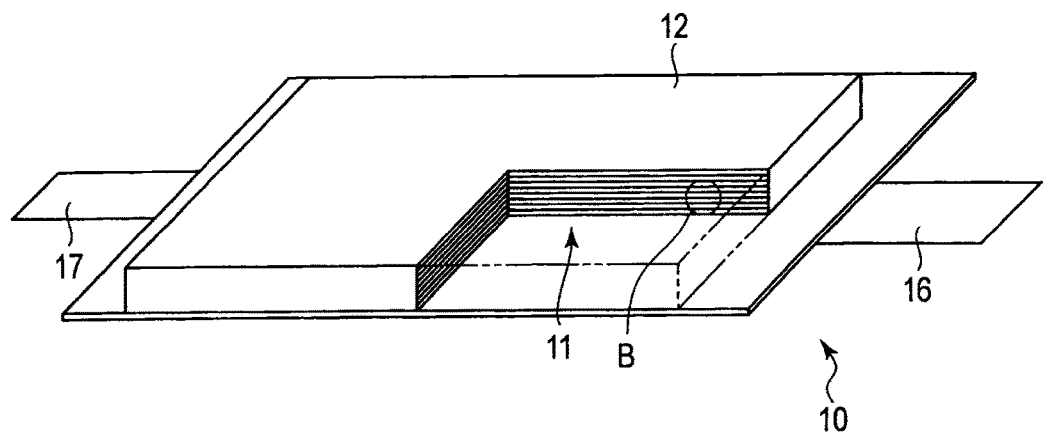
F I G. 5
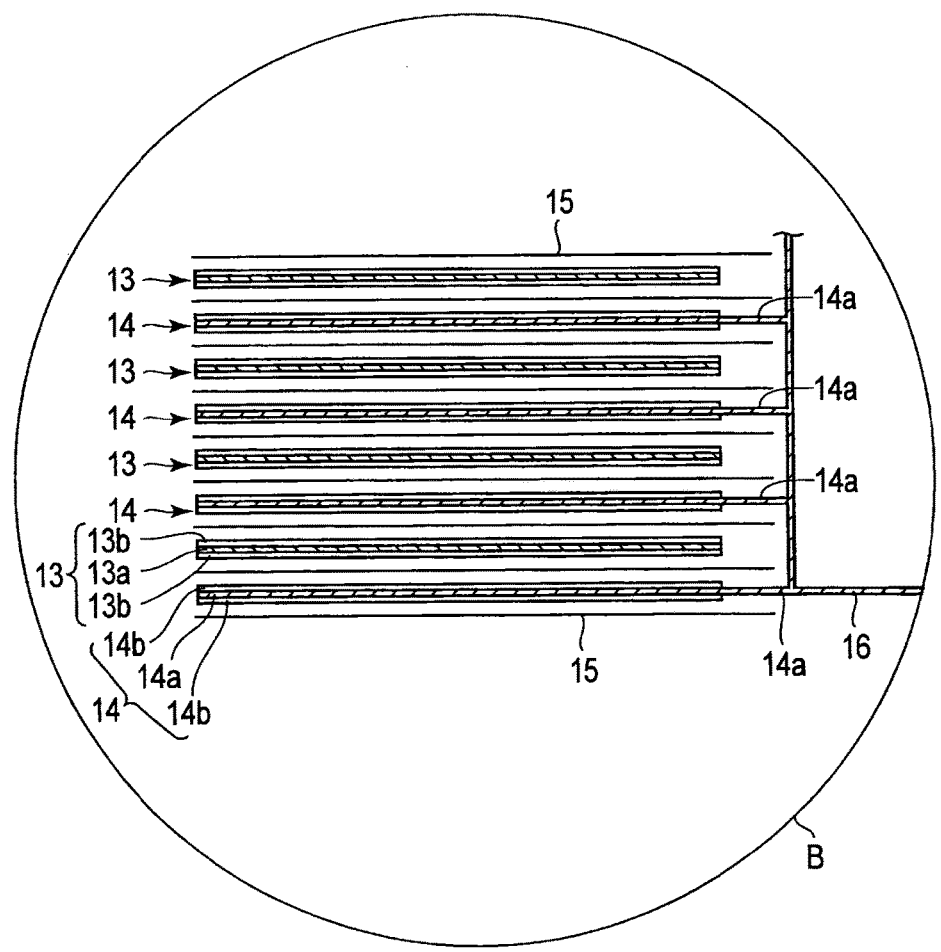
F I G. 6

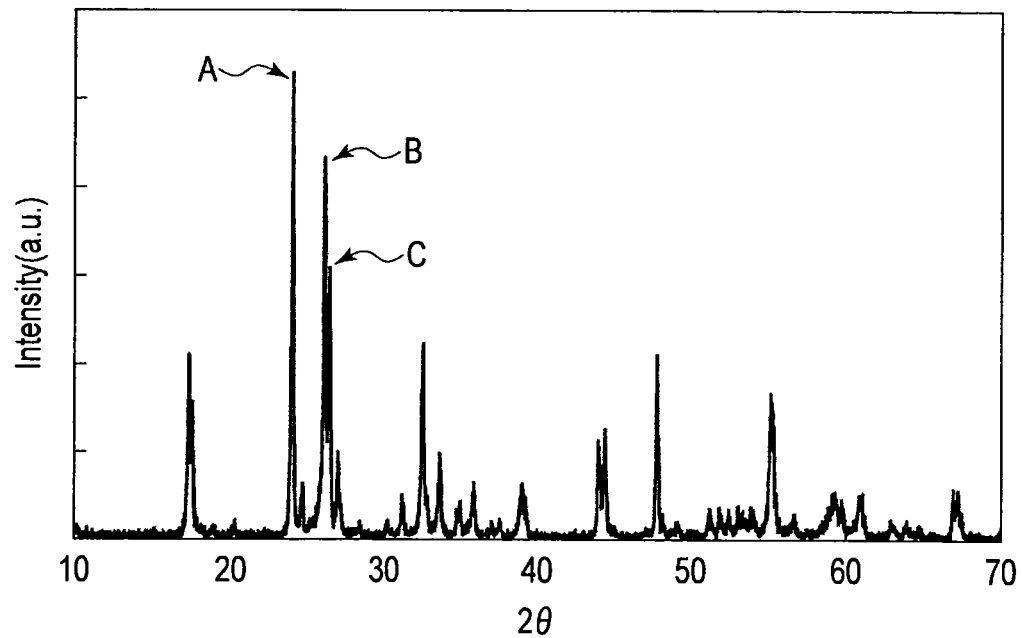
F I G. 11
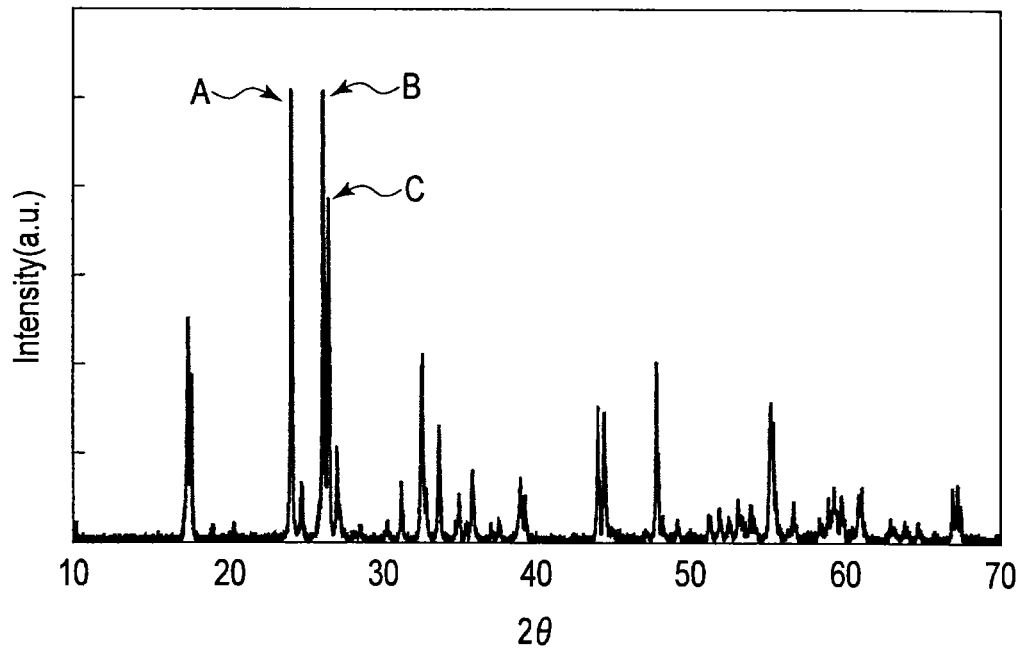
F I G. 12

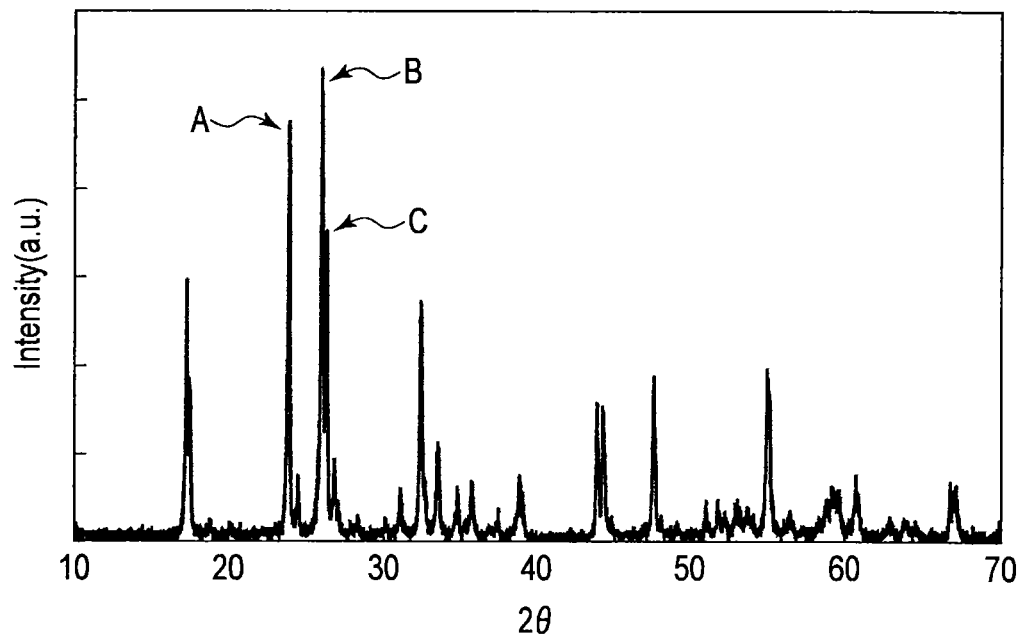
F I G. 13
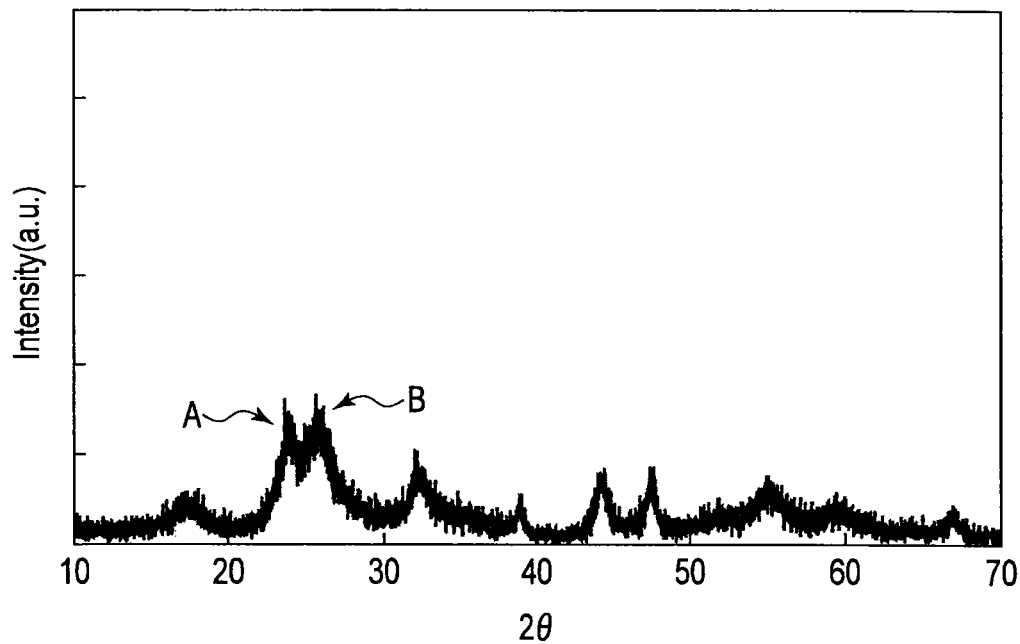
F I G. 14

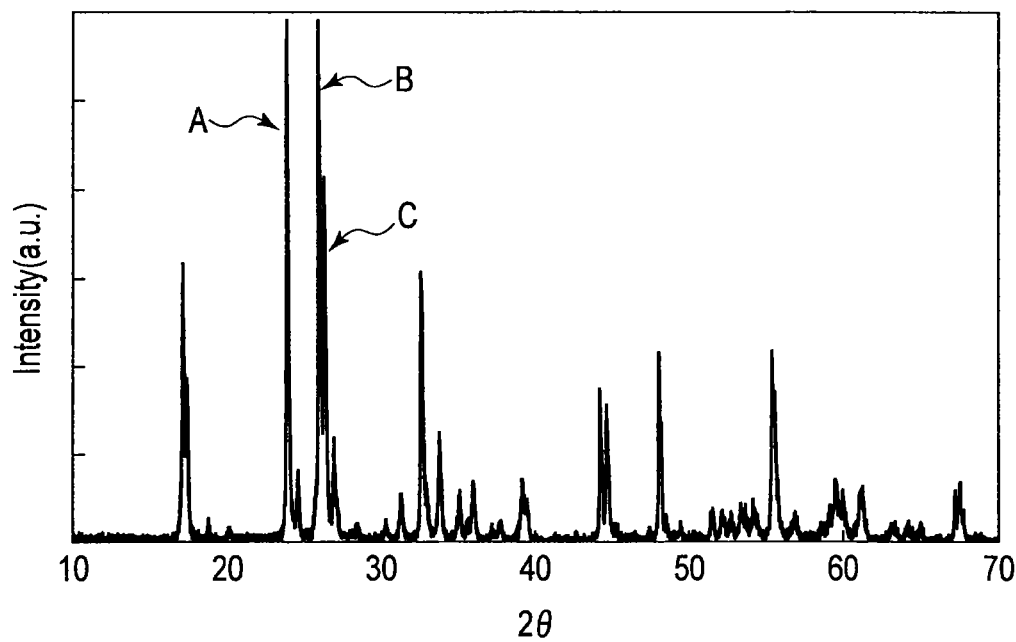
F I G. 17
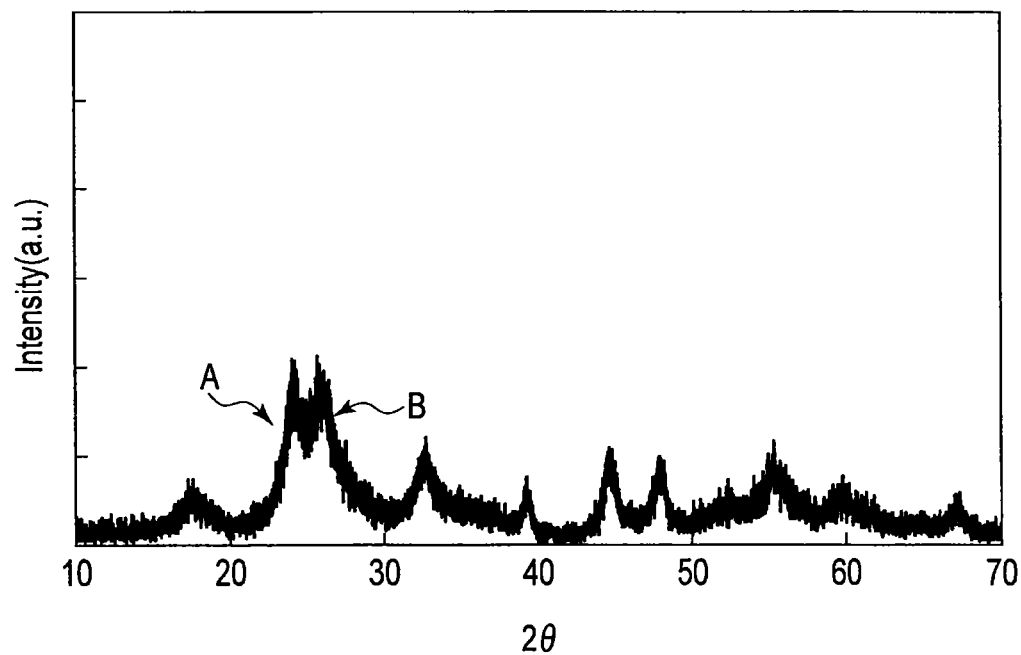
F I G. 18

ACTIVE SUBSTANCE USED FOR NONAQUEOUS ELECTROLYTE BATTERY

CROSS-REFERENCE TO RELATED APPLICATIONS

This application is based upon and claims the benefit of priority from the Japanese Patent Applications No. 2013-065040, filed Mar. 26, 2013; and No. 2014-45366, filed Mar. 7, 2014, the entire contents of all of which are incorporated herein by reference.

FIELD

Embodiments described herein relate generally to an active substance, a nonaqueous electrolyte battery and a battery pack.

BACKGROUND

Recently, a nonaqueous electrolyte battery such as a lithium-ion secondary battery has been developed as a battery having a high energy density. The nonaqueous electrolyte battery is expected to be used as a power source for vehicles such as hybrid vehicles or electric cars or a large-sized power source for electricity storage. Particularly, for use in vehicles, the nonaqueous electrolyte battery is desired to have other performances such as rapid charge/discharge performances and long-term reliability. For example, a nonaqueous electrolyte battery enabling rapid charge/discharge not only remarkably shortens the charging time but also makes it possible to improve performances related to the motive force of a hybrid vehicle and to efficiently recover the regenerative energy of them.

In order to enable rapid charge/discharge, it is necessary for electrons and lithium ions to be able to migrate rapidly between the positive electrode and the negative electrode. When a battery using a carbon based material in the negative electrode undergoes repeated rapid charge/discharge, dendrite precipitation of metal lithium occurs on the electrode. Dendrites cause internal short circuits, which can lead to heat generation and fires.

In light of this, a battery using a metal composite oxide as a negative electrode active material in place of a carbonaceous material has been developed. Particularly, in a battery using titanium oxide as the negative electrode active material, rapid charge/discharge can be performed stably. Such a battery also has a longer life than those using a carbonaceous material.

However, titanium oxide has a higher (nobler) potential relative to metal lithium than that of the carbonaceous material. Further, titanium oxide has a lower capacity per weight. Thus, a battery formed by using the titanium oxide has a problem such that the energy density is low.

For example, the potential of the electrode using titanium oxide is about 1.5 V based on metal lithium and is higher (i.e., nobler) than that of the negative electrode using the carbonaceous material. The potential of titanium oxide is due to the redox reaction between $Ti^{3+}$ and $Ti^{4+}$ when lithium is electrochemically inserted and released. Therefore, it is limited electrochemically. Further, there is the fact that rapid charge/discharge of lithium ion can be stably performed at an electrode potential as high as about 1.5 V. Therefore, it is substantially difficult to drop the potential of the electrode to improve energy density.

As to the capacity of the battery per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Therefore, the capacity density of titanium oxide is significantly lower than that of the carbon-based negative electrode. This is due to a reduction in substantial capacity because there are only a small number of lithium-absorption sites in the crystal structure and lithium tends to be stabilized in the structure.

In view of such circumstances, a new electrode material containing Ti and Nb has been examined. Particularly, a composite oxide represented by $TiNb_2O_7$ has been a focus of attention because a high capacity is obtained.

BRIEF DESCRIPTION OF THE DRAWINGS

FIG. 1 is a pattern diagram showing a crystal structure of monoclinic $TiNb_2O_7$;

FIG. 2 is a pattern diagram of the crystal structure of FIG. 1 as seen from another direction;

FIG. 5 is a partially cut perspective view schematically showing another flat-shaped nonaqueous electrolyte battery according to the second embodiment;

FIG. 6 is an enlarged sectional view of a B portion of FIG. 5;

FIG. 11 is a wide-angle X-ray diffraction pattern of active material particles of Example 3;

FIG. 12 is a wide-angle X-ray diffraction pattern of active material particles of Example 4;

FIG. 13 is a wide-angle X-ray diffraction pattern of active material particles of Example 5;

FIG. 14 is a wide-angle X-ray diffraction pattern of active material particles of Example 6;

FIG. 17 is a wide-angle X-ray diffraction pattern of active material particles of Example 9;

FIG. 18 is a wide-angle X-ray diffraction pattern of active material particles of Example 10;

DETAILED DESCRIPTION

Figure 3:
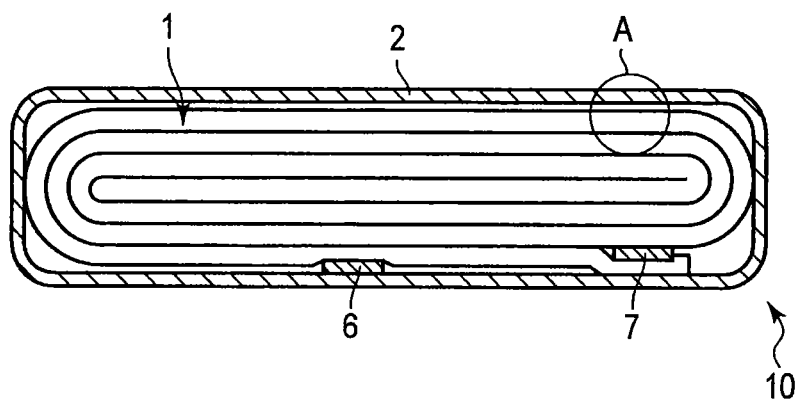
FIG. 3 is a cross-sectional view of a flat-shaped nonaqueous electrolyte battery according to a second embodiment.

In general, according to one embodiment, there is provided an active substance for a battery. The active substance contains active material particles. The active material particles include a compound represented by a formula: $Ti_{1-x}M1_xNb_{2-y}M2_yO_7$. In this formula, $0 \le x < 1$, $0 \le y < 1$ and each of elements M1 and M2 is at least one selected from the group consisting of Nb, V, Ta, Fe, Ti, Bi, Sb, As, P, Cr, Mo, W, B, Na, Mg, Al, and Si. The element M1 and the element M2 are identical or different from each other. The active material particles have a peak A, a peak B and a peak C in the X-ray diffraction pattern obtained by the X-ray diffraction method using Cu—Kα rays. The peak A is attributed to a (110) plane and appears at 2θ ranging from 23.74 to 24.14°. A peak B is attributed to a (003) plane and appears at 2θ ranging from 25.81 to 26.21°. A peak C is attributed to a ($\bar{6}$02) plane and appears at 2θ ranging from 26.14 to 26.54°. An intensity $I_A$ of the peak A, an intensity $I_B$ of the peak B, and an intensity $I_C$ of the peak C satisfy the following relations (1) and (2):

$$0.80 \leq I_B/I_A \leq 1.12 \quad (1); \text{ and}$$

$$I_C/I_B \leq 0.80 \quad (2).$$

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

(First Embodiment)

The active substance for a battery according to the first embodiment contains active material particles containing a compound of a formula: $Ti_{1-x}M1_xNb_{2-y}M2_yO_7$. In this formula, 0≤x<1, 0≤y<1 and each of elements M1 and M2 is at least one selected from the group consisting of Nb, V, Ta, Fe, Ti, Bi, Sb, As, P, Cr, Mo, W, B, Na, Mg, Al, and Si. The element M1 and the element M2 are identical or different from each other. The active material particles have a peak A, a peak B and a peak C in the X-ray diffraction pattern obtained by the X-ray diffraction method using Cu—Kα rays. The peak A is attributed to a (110) plane and appears at 2θ ranging from 23.74 to 24.14°. A peak B is attributed to a (003) plane and appears at 2θ ranging from 25.81 to 26.21°. A peak C is attributed to a ($\bar{6}$02) plane and appears at 2θ ranging from 26.14 to 26.54°. The intensity $I_A$ of the peak A, the intensity $I_B$ of the peak B, and the intensity $I_C$ of the peak C satisfy the following relations (1) and (2):

$$0.80 \leq I_B/I_A \leq 1.12 \quad (1); \text{ and}$$

$$I_C/I_B \leq 0.80 \quad (2).$$

Here, the active material particles contained in the active substance for a battery according to the first embodiment have a crystal structure having symmetry of space group C2/m and atomic coordination of $TiNb_2O_7$ described in M. Gasperi, Journal of Solid State Chemistry, 1984, 53, 144-147. Indexing of the planes is performed with reference to Liquan Chen et al., Energy & Environmental Science, 2011, 4, 2638-2644.

First, the crystal structure of $TiNb_2O_7$ will be described with reference to FIGS. 1 and 2.

FIG. 1 is a pattern diagram showing a crystal structure of monoclinic $TiNb_2O_7$. FIG. 2 is a pattern diagram of the crystal structure of FIG. 1 as seen from another direction.

As shown in FIG. 1, in the crystal structure of monoclinic $TiNb_2O_7$, a metal ion 101 and oxide ions 102 constitute a skeletal structure 103. Nb and Ti ions are randomly arranged in the location of the metal ions 101 of each of the skeletal structures at a Nb/Ti ratio of 2:1. The skeletal structures 103 are arranged three-dimensionally alternately, and voids 104 are present between the skeletal structures 103. The void 104 serves as a host of a lithium ion.

In FIG. 1, areas 105 and 106 are portions with two-dimensional channels in directions [100] and [010]. As shown in FIG. 2, in the crystal structure of monoclinic $TiNb_2O_7$, a void 107 is present in a direction [001]. The void 107 has a tunnel structure advantageous for the conduction of lithium ions and serves as a conduction path connecting the areas 105 and 106 in a [001] direction. Therefore, lithium ions can go back-and-forth between the areas 105 and 106 through the conduction path.

Thus, $TiNb_2O_7$ with a monoclinic crystal structure has an equivalently large space into which lithium ions are inserted and has a structural stability. Further, $TiNb_2O_7$ with a monoclinic crystal structure has two-dimensional channels enabling rapid diffusion of lithium ions and conduction paths connecting these channels in the direction [001]. Then, the lithium ions are inserted into and released from the insertion spaces effectively, and the insertion and release spaces for lithium ions are effectually increased. Thus, $TiNb_2O_7$ with a monoclinic crystal structure can provide a high capacity and high rate performance.

When lithium ions are inserted in the void 104, the metal ion 101 constituting the skeleton is reduced to a trivalent one, thereby maintaining electroneutrality of the crystal structure of $TiNb_2O_7$. In a niobium titanium composite oxide of this embodiment, not only is a Ti ion reduced from tetravalent to trivalent but also an Nb ion is reduced from pentavalent to trivalent. Because of this, the number of reduced valences per active material weight is large. Therefore, the electroneutrality of the crystal can be maintained, even if many lithium ions are inserted. Therefore, the energy density of the oxide is higher than that of a compound only containing a tetravalent cation, such as titanium oxide. The theoretical capacity of the niobium titanium composite oxide of this embodiment is about 387 mAh/g and is more than twice the value of titanium oxide having a spinel structure.

The niobium titanium composite oxide has a lithium absorption potential of about 1.5 V (vs. Li/Li$^+$). Therefore, a battery which is excellent in rate performance and is capable of stably repeating rapid charge/discharge can be provided by using the active material.

For the above described reasons, it is possible to provide an active substance for a battery which can achieve a battery having excellent rapid charge/discharge performance and a high energy density by using an active material containing a niobium titanium composite oxide.

However, the $TiNb_2O_7$ produced by sintering at 1100° C. or more for 24 hours or more has a structure close to an ideal crystal arrangement on the (003) plane and the ($\bar{6}$02) plane. When wide-angle X-ray diffraction measurement is performed on the original crystal structure of $TiNb_2O_7$, a spectrum in which peaks attributed to the (003) plane and the ($\bar{6}$02) plane are largely improved is obtained. The direction of the (003) plane and the direction of the ($\bar{6}$02) plane correspond to the direction where it is difficult to diffuse Li and thus they show a low capacity.

As for the active material particles contained in the active substance for a battery according to the first embodiment, in the X-ray diffraction pattern, the intensity $I_B$ of the peak B attributed with the (003) plane and the intensity $I_C$ of the peak C attributed to the ($\bar{6}$02) plane are relatively small. Specifically, in the active material particles contained in the active substance for a battery according to the first embodiment, the intensity $I_A$ of the peak A attributed to the (110) plane which appears in the X-ray diffraction pattern, the intensity $I_B$, and the intensity $I_C$ satisfy the relation (1):

$0.80 \leq I_B/I_A \leq 1.12$ and the relation (2) $I_C/I_B \leq 0.80$. The active material particles have a crystal structure in which the growth is suppressed on the (003) plane and the ($\bar{6}$02) plane where it is difficult to diffuse Li.

The active material particles contained in the active substance for a battery according to the first embodiment have the crystal structure in which the growth is suppressed on the (003) plane and the ($\bar{6}$02) plane where it is difficult to diffuse Li. Thus, the diffusion-in-solid of Li ions can be easily performed and the Li ion insertion stability can be improved. Thus, in the active substance for a battery according to the first embodiment, a decrease in the open-circuit voltage caused by Li insertion is relaxed, and a larger amount of Li can be inserted. Thus, the battery produced using the active substance for a battery according to the first embodiment can exhibit a high capacity and improved rapid charge and discharge characteristics.

When the peak intensity ratio $I_B/I_A$ is larger than 1.12, this means that the crystal growth in the direction perpendicular to the (003) plane where it is difficult to diffuse Li is not sufficiently suppressed. Therefore, the active substance for a battery containing active material particles where the peak intensity ratio $I_B/I_A$ is larger than 1.12 is poor in Li ion insertion stability.

When the peak intensity ratio $I_B/I_A$ is smaller than 0.80, this means that the $TiNb_2O_7$ phase is not sufficiently grown. Therefore, the active substance for a battery containing active material particles where the peak intensity ratio $I_B/I_A$ is smaller than 0.80 is poor in Li ion insertion stability.

When the peak intensity ratio $I_C/I_B$ is larger than 0.8, this means that the crystal growth on the ($\bar{6}$02) plane where it is difficult to diffuse Li is not sufficiently suppressed. Therefore, the active substance for a battery containing active material particles where the peak intensity ratio $I_C/I_B$ is larger than 0.8 is poor in Li ion absorption stability. Preferably, the intensity of the peak C is too low to be visually measured in the X-ray diffraction pattern. Therefore, the lower limit of the peak intensity ratio $I_C/I_B$ is 0.

The peak intensity ratio $I_B/I_A$ is preferably from 0.9 to 1.1. If the peak intensity ratio $I_B/I_A$ is within this range, the high capacity as well as rapid charge characteristics are improved. Further, the peak intensity ratio $I_C/I_B$ is preferably from 0.6 to 0.75. If the peak intensity ratio $I_C/I_B$ is within this range, the high capacity as well as rapid charge characteristics are improved.

The X-ray diffraction pattern of the active material particles contained in the active substance for a battery according to the first embodiment is obtained by X-ray diffraction (XRD) using Cu—Kα rays. As the X-ray diffraction method, for example, the wide-angle X-ray diffraction method can be listed.

Hereinafter, an example of the wide-angle X-ray diffraction method which can be used to obtain the X-ray diffraction pattern of the active material particles contained in the active substance for a battery according to the first embodiment will be described.

First, a sample to be measured, that is, the active material particles contained in the active substance for a battery according to the first embodiment are ground until the average particle size becomes 5 μm or less. The average particle size can be determined with a laser diffraction particle size distribution measuring device. A holder portion of a glass sample plate is filled with the ground sample. As a sample stand, for example, a glass sample plate with a holder portion having a depth of 0.2 mm can be used. The holder portion is filled with the sample, and the surface of the sample is flattened by sufficiently pressing a glass plate to the sample. The glass sample plate which is filled with the sample is placed on a powder X-ray diffractometer and subjected to powder X-ray diffraction, and then measured by the X-ray diffraction method using Cu—Kα rays.

As for the measurement device, the measurement conditions are, for example, as follows.

(1) X-ray diffractometer: M18XHF22-SRA manufactured by Mac Science Co., Ltd.
  X-ray source: CuKα rays
  Output: 40 kV, 100 mA
  Slit system: Div. Slit; 0.5°
(2) Scanning method: 2 θ/θ continuous scanning
(3) Measurement range (2θ): 5° to 70°
(4) Sampling width (2θ): 0.01°
(5) Scanning speed: 2°/min When the peak intensity ratio is calculated, processes such as removal of a background, and separation, smoothing, and fitting of peaks of Kα1 and Kα2 are not performed in order to avoid errors in estimation due to data processing. The peak intensity ratio is calculated from the maximum value of intensities of the peaks of measured data including the measured Kα1 and Kα2 lines.

When the wide-angle X-ray diffraction measurement is performed on the active material particles contained in the electrode, it can be performed, for example, as follows.

First, in order to analyze the crystal state of the active material particles contained in the active substance for a battery, the active material particles are put into a state in which lithium ions are perfectly released from the niobium titanium composite oxide.

For example, when the active material particles contained in the negative electrode are measured, the battery is put into a fully discharged state. However, there is the case where a small amount of lithium ions remains even in a discharged state. Next, the battery is disintegrated in a glove box filled with argon. Then, the electrode is washed with an appropriate solvent. If the battery is the nonaqueous electrolyte battery, as the solvent to be used here, it is preferable to use the nonaqueous solvent of the nonaqueous electrolyte such as ethyl methyl carbonate. Subsequently, the negative electrode material layer is peeled from the washed negative electrode. At this time, peaks originated from the ingredients such as a current collector foil, conductive assistant, and binder are previously measured using XRD so as to grasp the positions of the peaks originated from them. When there are peaks overlapped with the active material particles, it is necessary to separate peaks except for the active material particles. The electrode recovered from the battery is thus measured so that the wide-angle X-ray diffraction measurement can be performed on the active material particles contained in the battery.

When the orientation of the sample is high, the position of a peak may be shifted or the intensity ratio may be changed depending on the way of filling the sample. The sample is made into a pellet form for measurement. The pellet may be a compressed powder body, for example, 10 mm in diameter and 2 mm in thickness. The compressed powder body may be produced by applying a pressure of about 250 MPa to the sample for 15 minutes. The obtained pellet is set to the X-ray diffractometer to measure the surface. The measurement using such a method allows a difference in the measurement results by operators to be eliminated, and thus the reproducibility can be improved.

As for the content of elements in the active material particles contained in the active substance for a battery according to the first embodiment, for example, the content of Nb and Ti elements can be quantified by inductively coupled plasma (ICP) emission spectrometry. The content of the O element can be quantified by inert gas fusion-infrared absorptiometry. The content of the elements in the active material particles contained in the electrode can be quantified by heating the portion peeled from the electrode in air for a short time (at 500° C. for about 1 hour) to allow unnecessary portions such as the binder component and carbon to be burnt down and then subjecting such portions to ICP emission spectrometry. However, it is difficult to exactly quantify the O element.

In the compound contained in the active material for a battery according to the first embodiment, the molar ratio of the Ti element to the Nb element may be beyond 1:2.

For example, the compound contained in the active material for a battery according to the first embodiment may contain the Nb element in an amount larger than 2 mol based on 1 mol of the Ti element. The compound may be, for example, one in which a part of the Ti element of the compound $TiNb_2O_7$ is replaced with the Nb element. Alternatively, the compound contained in the active material for a battery according to the first embodiment may contain the Nb element in an amount smaller than 2 mol based on 1 mol of the Ti element. The compound may be, for example, one in which a part of the Nb element of the compound $TiNb_2O_7$ is replaced with the Ti element.

The compound contained in the active material for a battery according to the first embodiment may contain metallic elements other than the Ti and Nb elements. Examples of the metallic elements other than the Ti and Nb elements may include V, Ta, Fe, Bi, Sb, As, P, Cr, Mo, W, B, Na, Mg, Al, and Si. These elements may be replaced with a part of the Ti element of the compound $TiNb_2O_7$ and/or a part of the Nb element.

Therefore, the compound in the active material particles contained in the active material for a battery according to the first embodiment can be expressed by the formula: $Ti_{1-x}M1_xNb_{2-y}M2_yO_7$ ($0 \leq x < 1$, $0 \leq y < 1$). "M1" in the general formula means an element substituted for a part of the Ti element in the composition formula: $TiNb_2O_7$. "M2" in the formula of the compound in the active material particles contained in the active material for a battery according to the first embodiment means an element substituted for a part of the Nb element in the composition formula: $TiNb_2O_7$. The elements M1 and M2 may be at least one selected from the group consisting of Nb, V, Ta, Fe, Ti, Bi, Sb, As, P, Cr, Mo, W, B, Na, Mg, Al, and Si. The elements M1 and M2 may be identical or may be different from each other.

It is expected that the capacity of the active material particles contained in the active material for a battery according to the first embodiment can be further improved by partially substituting the Ti element in the compound $TiNb_2O_7$ for the element M1 and/or partially substituting the Nb element for the element M2. For example, when V, Ta, Bi, Sb, As or P is used as a substituted element, a part of the Nb element may be substituted and a part of the Ti element can be substituted. Since these elements are pentavalent, the electronic conductivity of the compound $TiNb_2O_7$ can be improved by substituting a part of the Ti element. Due to this substitution, it is expected that the capacity and rapid charge performance can be further improved. A hexavalent element such as Cr, Mo or W can substitute a part of the Nb element. Due to this substitution, the improvement of the electron conductivity of the compound $TiNb_2O_7$ is expected. The elements such as B, Na, Mg and Si are elements lighter than the Ti element. Thus, it is expected that if a part of the Ti element is substituted for these elements, the capacity can be further improved. A trivalent element such as Fe or Al can substitute a part of the Ti element. Due to this substitution, the improvement of the electron conductivity of the compound $TiNb_2O_7$ is expected.

Even if a part of the Nb element is substituted for Ta in the compound $TiNb_2O_7$, equivalent characteristics can be obtained. This is attributed to the fact that Ta is a material included in the columbite (i.e., a mineral ore including Nb), and Nb and Ta have the same physical, chemical, and electrical properties.

Further, it is expected that the effects of the added elements such as Mo, W, and V as sintering aids decrease the sintering temperature at the time of production.

The compound in the active material particles contained in the active substance for a battery according to the first embodiment can be also represented by the formula: $Ti_{1-x}M_xNb_2O_7$ ($0 \leq x < 1$).

"M" in the above formula $Ti_{1-x}M1_xNb_2O_7$ means an element substituted by a part of the Ti element in $TiNb_2O_7$. It is expected that the capacity of the active material particles contained in the active substance for a battery according to the first embodiment can be further improved by partially substituting the Ti element in the compound $TiNb_2O_7$ with the element M. For example, the elements such as Nb, V, Ta, Bi, Sb, As, P, Cr, Mo and W are pentavalent or hexavalent. Thus, when Nb, V, Ta, Bi, Sb, As, P, Cr, Mo or W is used as the element M, it is expected that the capacity and rapid charge performance can be further improved by improving the electron conductivity of the active substance. The elements such as B, Na, Mg, Al, and Si are elements lighter than the Ti element. Thus, it is expected that if a part of the Ti element can be substituted by these elements, the capacity can be further improved.

The content of the element M in the active material particles contained in the active substance for a battery according to the first embodiment can be quantified, for example, by ICP spectroscopic analysis.

The compound represented by the formula: $Ti_{1-x}M1_xNb_{2-y}M2_yO_7$ ($0 \leq x < 1$, $0 \leq y < 1$) can be represented by the formula: $Ti_{1-x}M1_xNb_{2-y}M2_yO_{7+\delta}$ ($0 \leq x < 1$, $0 \leq y < 1$, $-0.3 \leq \delta \leq 0.3$).

Oxygen deficiency may occur in a raw material or an intermediate product during preparation of a composite oxide. Further, inevitable impurities contained in the raw material and impurities mixed therein during the preparation may be present in the prepared composite oxide. Thus, the active substance for a battery according to the first embodiment may contain, for example, an oxide having the composition beyond the stoichiometric mixture ratio represented by the formula: $Ti_{1-x}M1_xNb_{2-y}M2_yO_7$ ($0 \leq x < 1$, $0 \leq y < 1$) due to the inevitable factor. For example, due to the oxygen deficiency which occurs during the preparation of the oxide, an oxide having the composition represented by the formula $Ti_{1-x}M1_xNb_{2-y}M2_yO_{7+\delta}$ ($0 \leq x < 1$, $0 \leq y < 1$, $0 < \delta \leq 0.3$) may be prepared.

However, even an oxide having a composition beyond the stoichiometric mixture ratio due to the inevitable factor can show excellent Li ion insertion stability. Thus, active material particles which contain the oxide having the composition beyond the stoichiometric mixture ratio due to the inevitable factor can exert the same effect as that of active material particles that contain the oxide having the composition represented by the formula: $Ti_{1-x}M1_xNb_{2-y}M2_yO_7$ ($0 \leq x < 1$, $0 \leq y < 1$).

For the above reason, the active material particles contained in the active substance for a battery according to the embodiment encompass active material particles that contain an orthorhombic oxide having the composition beyond the stoichiometric mixture ratio represented by the formula: $Ti_{1-x}M1_xNb_{2-y}M2_yO_7$ ($0 \leq x < 1$, $0 \leq y < 1$) due to the inevitable factor.

The active substance for a battery according to the first embodiment may further contain a carbon material. Examples of the carbon material can include carbonaceous substances and graphitized substances.

The carbon material can improve the conductivity of the active substance for a battery according to the first embodiment. For example, in the active substance for a battery according to the first embodiment which contains the carbon material, even if the particle size of the active material particles is 1 μm or less, sufficient conductivity can be obtained. The amount of the carbon material is preferably from 0.5 wt % to 20 wt % based on the total weight of the active substance for a battery.

For example, the carbon material is contained in the form of particles or the form of lamina. For example, at least some of the active material particles may be covered with the carbon material. The carbon material which covers the active material particles can suppress the surface reaction of the active substance for a battery according to the first embodiment when used for the battery. Eventually, it can suppress the deterioration of the active substance for a battery. The presence or absence of coating with the carbon material can be confirmed by the presence or absence of the peak attributed to the carbon which is obtained by, for example, an Electron Probe MicroAnalyser (EPMA). The morphology of coating with the carbon material can be confirmed from, for example, a Scanning Electron Microscope (SEM) image.

The primary particle size and BET specific surface area of the active substance for a battery according to the first embodiment are not particularly limited and they can be changed according to desired battery characteristics. The active material may be granulated. The primary particle size is more preferably from 0.01 μm to 10 μm. If the primary particle size is in this range, a good rate performance is obtained. The primary particle diameter is determined by observing an SEM image, counting the primary particle diameter of 100 to 1000 primary particles, and calculating the average particle size. The BET specific surface area is more preferably 0.1 m²/g or more but less than 50 m²/g. If it is 0.1 m²/g or more, the contact area with the electrolyte solution can be ensured. Thus, a good rate performance is obtained. On the other hand, if the specific surface area is less than 50 m²/g, coating properties of a slurry containing the active material can be improved in the process of producing an electrode. The BET specific surface area is measured using the $N_2$ gas absorption method.

When the compound represented by the formula: $Ti_{1-x}M1_xNb_{2-y}M2_yO_7$ which is contained in the active material particles in the active substance for a battery according to the first embodiment is used in the nonaqueous electrolyte battery, it can be represented by the formula: $Li_zTi_{1-x}M1_xNb_{2-y}M2_yO_7$ (wherein $0 \leq z \leq 5$) according to the charge state of the battery. This means that the compound can contain Li in an amount of 0 mol to 5 mol per mol.

<Production Method>

When $TiNb_2O_7$ is synthesized by the conventional synthesis method by the solid-phase method, the reaction during sintering is kinetically slow. In order to obtain crystals with a homogeneous composition, it is necessary to sinter at 1000° C. or more for a total duration of 48 hours or more. In this case, a highly crystalline material is obtained. However, it leads coarse particles having a fine crystal structure. Thus, there may be a problem such that the capacity and rapid charge characteristics are reduced. In the conventional synthesis method by the sol-gel method, a high temperature treatment method at 1350° C. or more is disclosed. When the sintering temperature reaches 1300° C. or more, the crystal growth of $TiNb_2O_7$ suddenly progresses. This may cause the same problem.

By for example, the hydrothermal crystallization method below, the active material particles contained in the active substance for a battery according to the first embodiment can be produced at a lower temperature and in a shorter time as compared to the conventional method described above.

(1) First, starting materials are mixed so that a Nb/Ti ratio is a predetermined molar ratio. The starting materials are not particularly limited. For example, solutions which contain hydroxides containing Ti or Nb, sulfides containing Ti or Nb, oxides containing Ti or Nb, salts containing Ti or Nb, alkoxides containing Ti or Nb or organic compounds containing Ti or Nb can be used. Examples of the Ti source include $TiOSO_4$, $TiO_2$, $(NH_4)_2TiO(C_2O_4) \cdot H_2O$, $TiO(OH)_2$, $C_{12}H_{28}O_4Ti$, and $TiCl_4$. Examples of the Nb source include $NbCl_5$, $Nb(OH)_5$, $C_2H_8N_2O_4 \cdot Nb$, and $Nb_2O_5$.

When the starting materials are mixed, the molar ratio (Nb/Ti) at the time of preparing the raw material is set to greater than 2. More preferably, the molar ratio (Nb/Ti) at the time of preparing the raw material is set to greater than 2 and 2.4 or less. Here, the molar ratio (Nb/Ti) is a molar ratio at the time of preparation and is different from the composition ratio observed in the active material particles after the production. When a thermal reaction is caused in the autoclave container described below, the nucleation of $TiO_2$ anatase is faster than the formation of the precursor of $TiNb_2O_7$. Therefore, when the molar ratio (Nb/T) at the time of preparing the raw material is set to 2 or less, the nucleation of $TiO_2$ anatase is caused at the time of the hydrothermal synthesis in the autoclave container described below. In this case, a single phase of $TiNb_2O_7$ is not formed in the active material after production. Accordingly, there is a problem such that battery characteristics are reduced. The present inventors have repeatedly conducted intensive studies, and as a result, they have found that when the molar ratio (Nb/T) at the time of preparing the raw material of Nb/T is set to greater than 2, it is possible to suppress deposition of $TiO_2$. When the ratio (Nb/Ti) is set to 2, and at least one element M1 and/or M2 selected from the group consisting of V, Ta, Fe, Bi, Sb, As, P, Cr, Mo, W, B, Na, Mg, Al and Si is added to allow the molar ratio (Nb/(Ti+M1+M2)) to be greater than 2 but 2.4 or less, the same effect can be expected.

The pH of the starting materials may be adjusted. An acid solution such as sulfuric acid or an alkaline solution such as an ammonia solution can be used to adjust the pH. Further, a solution containing a carbon source can be used as a mixed solution. The carbon source is not particularly limited. Examples thereof include saccharides, polyolefins, nitriles, alcohols, organic compounds containing a benzene ring. For the purpose of forming a structure in which the active material particles are supported with the carbon sources, it is possible to use carbon black, graphite or the like.

The molar ratio (Nb/Ti) when mixing the starting materials is preferably $2 < Nb/Ti \leq 2.4$. If the molar ratio (Nb/Ti) is in this range, it is possible to prevent $TiO_2$ from being precipitated as an impurity phase after the reaction in the autoclave container described below. Further, it is possible to prevent the crystallinity of the sample sintered after the reaction in the autoclave from decreasing.

When the ratio (Nb/Ti) is set to 2, and at least one element M1 and/or M2 selected from the group consisting of V, Ta, Fe, Bi, Sb, As, P, Cr, Mo, W, B, Na, Mg, Al and Si is added so as to be 2<Nb/Ti+M1+M2≤2.4, it is expected that the element M1 and/or M2 serves as an inhibitor of the growth of the $TiO_2$ phase. Therefore, in this case, when the molar ratio (Nb/Ti) is set within the range of 2<Nb/Ti≤2.4, the same effect can be expected.

(2) Subsequently, a mixture obtained by mixing starting materials is heated in a closed container such as the autoclave container. The temperature when heating is preferably from 150° C. to 250° C. The heating time is preferably from 1 hour to 100 hours. When the synthesis is performed at a high temperature or for a long time, $TiO_2$ may be precipitated. From the viewpoint of suppressing the precipitation, the heating temperature is more preferably from 150° C. to 200° C. and the heating duration is preferably from 1 hour to 10 hours.

(3) Subsequently, the product in the autoclave is taken out after heating, followed by filtration and washing.

Water, an organic solvent such as ethanol, an alkaline solution such as ammonia, an acid solution such as hydrochloric acid may be used for washing.

Precursor particles are obtained after washing. The precursor particles thus obtained are characterized by an amorphous state in which Nb and Ti are mixed at the atomic level. Using the precursor particles in the amorphous state in which Nb and Ti are mixed at the atomic level, the $TiNb_2O_7$ phase can be obtained by sintering at a low temperature in a shorter time. Thanks to this, it is possible to control the temperature and time in the sintering process described below, that is, to perform the sintering process under milder conditions.

The amorphous state of the precursor particles obtained by the above described method can be confirmed by, for example, the presence or absence of a halo peak (amorphous peak) in the X-ray diffraction measurement. However, besides the amorphous peak, a small amount of impurities, such as $TiO_2$, may be mixed therein. However, if no impurity peak appears in the active material after the sintering, the active substance has a high capacity. Accordingly, there is no problem if a very small amount of the impurities is contained.

(4) Subsequently, the obtained precursor particles are subjected to sintering. The sintering is performed in a temperature range of 500° C. to 1200° C. The sintering duration is set to 1 hour to 24 hours. More preferably, the sintering temperature is from 600° C. to 1100° C. and the sintering duration is from 1 hour to 12 hours.

When the starting materials include a carbon source, the sintering is preferably performed in a reduction atmosphere.

When the sintering is performed under the above conditions, particles in which a phase with the crystal structure of $TiNb_2O_7$ is formed can be obtained.

When the sintering temperature is 800° C. or more, the grain growth or necking between particles is proceeded. Thus, from the viewpoint of improving the crystallinity while suppressing the grain growth or necking between particles, an additional sintering process in a temperature range of 600° C. to 800° C. for 1 hour to 24 hours can be added before and after the above sintering.

In the exemplified method, a mixture prepared by setting the molar ratio (Nb/Ti) at the time of preparing the raw material of Nb/Ti to greater than 2 is heated in a closed container under the above conditions so that the precursor particles to be sintered are obtained as an amorphous state in which Nb and Ti are mixed at the atomic level. When the precursor particles are subjected to the sintering, it is possible to obtain active material particles containing the compound represented by the formula: $Ti_{1-x}M1_xNb_{2-y}M2_yO_7$ (0≤x<1, 0≤y<1) in which the growth is suppressed on the (003) plane and the ($\overline{6}$02) plane where it is difficult to diffuse Li, that is, the ratio of the intensity $I_A$ of the peak A and intensity $I_B$ of the peak B satisfies the relation (1): 0.80≤$I_B$/$I_A$ ≤1.12 and the ratio of the intensity $I_B$ of the peak B and the intensity $I_C$ of the peak C satisfies the relation (2): $I_C$/$I_B$ ≤0.80.

In the above method, as an arbitrary step, a carbon material can be mixed with the particles obtained by sintering. The method for mixing the carbon material is not particularly limited. Examples of the carbon source include saccharides, polyolefins, nitriles, alcohols, and organic compounds containing a benzene ring. It is possible to allow the material to be mechanically supported by carbon black or graphite by using a planetary ball mill.

The active material particles are mixed with the carbon source, followed by sintering in a reduction atmosphere.

As the method for producing the active material particles contained in the active material for batteries according to the first embodiment, techniques including the hydrothermal synthesis method are described above. However, if the precursor powder to be subjected to sintering can be synthesized in a state close to amorphous, the active material particles can be synthesized by another method such as the solid-phase method or the sol-gel method.

The active substance for a battery according to the first embodiment contains active material particles containing the compound represented by the formula: $Ti_{1-x}M1_xNb_{2-y}M2_yO_7$ (0≤x<1, 0≤y<1). Regarding the active material particles, the intensity $I_A$ of the peak A attributed to the (110) plane, the intensity $I_B$ of the peak B attributed to the (003) plane, and the intensity $I_C$ of the peak C attributed to the ($\overline{6}$02) plane satisfy the following relation (1): 0.80≤$I_B$/$I_A$ ≤1.12 and relation (2): $I_C$/$I_B$ ≤0.80. The active material has the crystal structure in which the growth is suppressed on the (003) plane and the ($\overline{6}$02) plane where it is difficult to diffuse Li. Thus, the diffusion in solid of Li ions can be easily performed and the Li ion insertion stability can be improved. Therefore, the nonaqueous electrolyte battery produced using the active substance for a battery according to the first embodiment can exhibit a high capacity and improved rapid charge and discharge characteristics.

(Second Embodiment)

According to the second embodiment, there is provided a nonaqueous electrolyte battery. The nonaqueous electrolyte battery includes a negative electrode, a positive electrode, and a nonaqueous electrolyte. The active substance in the first embodiment is used for the negative electrode active material, the positive electrode active material, or both of the negative electrode active material and the positive electrode active material.

The nonaqueous electrolyte battery according to the second embodiment may further includes a separator provided between the positive electrode and the negative electrode, and a container which houses the positive electrode, the negative electrode, the separator, and the nonaqueous electrolyte.

Hereinafter, the negative electrode, the positive electrode, the nonaqueous electrolyte, the separator, and the container will be described in detail.

1) Positive Electrode

The positive electrode includes a current collector and a positive electrode material layer (positive electrode active material-containing layer) which is formed on one side or both sides of the current collector. The positive electrode material layer includes the active material and the binder.

Examples of the active material used include oxides, sulfides, and polymers. Examples thereof include manganese dioxide ($MnO_2$), iron oxide, copper oxide, and nickel oxide each of which absorbs lithium, lithium manganese composite oxides (e.g., $Li_xMn_2O_4$ or $Li_{0.5x}MnO_2$ (wherein $0 \leq x \leq 1$)), lithium nickel composite oxides (e.g., $Li_xNiO_2$ (wherein $0 \leq x \leq 1$)), lithium cobalt composite oxides (e.g., $Li_xCoO_2$ (wherein $0 \leq x \leq 1$)), lithium nickel cobalt composite oxides (e.g., $Li_xNi_{1-y}Co_yO_2$) (wherein $0 \leq x \leq 1$ and $0 \leq y \leq 1$)), lithium manganese cobalt composite oxides (e.g., $Li_xMn_yCo_{1-y}O_2$ (wherein $0 \leq x \leq 1$ and $0 \leq y \leq 1$)), spinel-type lithium manganese nickel composite oxides (e.g., $Li_xMn_{2-y}Ni_yO_4$ (wherein $0 \leq x \leq 1$ and $0 \leq y \leq 2$)), lithium phosphorus oxides having an olivine structure (e.g., $Li_xFePO_4$, $Li_xFe_{1-y}MnyPO_4$, $Li_xCoPO_4$ (wherein $0 \leq x \leq 1$ and $0 \leq y \leq 1$)), iron sulfate ($Fe_2(SO_4)_3$), vanadium oxides (e.g., $V_2O_5$), and lithium nickel cobalt manganese composite oxides. As the active material, these compounds may be used alone or in combination with a plurality of compounds.

As the polymer, for example, conductive polymer materials such as polyaniline and polypyrrole, or disulfide-based polymer materials can be used. Sulfur (S) and a carbon fluoride can also be used as an active material.

Preferable examples of the active material include compounds for the positive electrode potential, such as lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($LiNi_{1-y}Co_yO_2$) spinel-type lithium manganese nickel composite oxide ($Li_xMn_{2-y}Ni_yO_4$), lithium manganese cobalt composite oxide ($Li_xMn_yCo_{1-y}O_2$), lithium iron phosphate ($Li_xFePO_4$), and lithium nickel cobalt manganese composite oxide. Here, x and y may fall within the above described range.

Particularly, when a nonaqueous electrolyte containing ordinary temperature molten salt is used, it is preferable to use lithium iron phosphate, $Li_xVPO_4F$ (wherein $0 \leq x \leq 1$), a lithium manganese composite oxide, a lithium nickel composite oxide, and a lithium nickel cobalt composite oxide from the viewpoint of cycle life. This is because the reactivity of the positive electrode active material with ordinary temperature molten salt is decreased.

The specific surface area of the active material is preferably from 0.1 $m^2/g$ to 10 $m^2/g$. In the case of the positive electrode active material having a specific surface area of 0.1 $m^2/g$ or more, the absorption and release site of lithium ions can be sufficiently ensured. In the case of the positive electrode active material having a specific surface area of 10 $m^2/g$ or less, the handling in the industrial production is made easy, and therefore, a good charge and discharge cycle performance can be ensured.

The binder binds the active material to the current collector. Examples of the binder include polytetrafluoroethylene (PTFE), polyvinylidene fluoride (PVdF), and fluorine-based rubber.

The conductive agent is added, if necessary, to improve the current collection performance and suppress the contact resistance with the active material and current collector. Examples of the conductive agent include carbonaceous substances such as acetylene black, carbon black, and graphite.

In the positive electrode material layer, blending rates of the active material and binder are preferably 80 wt % to 98 wt % and 2 wt % to 20 wt %, respectively.

When the amount of the binder is 2 wt % or more, sufficient electrode strength is obtained. Further, when the amount of the binder is 20 wt % or less, the amount of the insulating material of the electrode can be reduced, leading to reduced internal resistance.

When the conductive agent is added, blending rates of the active material, binder, and conductive agent are preferably in a range of 77 wt % to 95 wt %, a range of 2 wt % to 20 wt %, and a range of 3 wt % to 15 wt %, respectively. When the amount of the conductive agent is 3 wt % or more, the above effect can be exerted. Further, when the amount of the conductive agent is 15 wt % or less, the decomposition of the nonaqueous electrolyte on the plane of the positive electrode conductive agent during storage at high temperatures can be reduced.

The current collector is preferably an aluminum foil or an aluminum alloy foil containing an element or elements such as Mg, Ti, Zn, Ni, Cr, Mn, Fe, Cu or Si.

The thickness of the aluminum foil or aluminum alloy foil is preferably 5 μm or more but 20 μm or less, more preferably 15 μm or less. The purity of the aluminum foil is preferably 99 wt % or more. The content of aluminum or transition metals such as iron, copper, nickel, and chromium contained in the aluminum alloy foil is preferably to be 1 wt % or less.

For example, the positive electrode may be produced as follows. At first, the active material, the binder, and the conductive agent which is added if necessary, are suspended in an appropriate solvent to prepare slurry. Next, the slurry is applied to the positive electrode current collector to form a coated film. And then, the film is dried to form a positive electrode material layer. Finally, the dried film is pressed so that the positive electrode is obtained. Alternatively, the positive electrode may also be produced by forming a pellet comprising the active material, the binder, and the conductive agent which is added if necessary to produce a positive electrode material layer, which is then arranged on the current collector.

2) Negative Electrode

The negative electrode includes a current collector and a negative electrode material layer (negative electrode active material containing layer) which is formed on one side or both sides of the current collector. The negative electrode material layer includes the active material, the conductive agent, and the binder.

The active material is active material particles contained in the active substance for a battery according to the first embodiment. The active material particles contain a compound represented by the formula: $Ti_{1-x}M1_xNb_{2-y}M2_yO_7$ ($0 \leq x < 1$, $0 \leq y < 1$). The compound has a crystal structure of a monoclinic niobium titanium composite oxide. The compound may be modified with at least one ion selected from the group consisting of an alkali metal cation, an alkaline earth metal cation, a transition metal cation, a sulfide ion, a sulfate ion, and a chloride ion.

As the active material, the active material particles may be used alone or in combination with other active materials. Usable examples of other active materials include anatase type titanium dioxide $TiO_2$, β-type titanium dioxide, $Li_2Ti_3O_7$ (i.e., ramsdellite-type lithium titanate), $Li_4Ti_5O_{12}$ (i.e., spinel-type lithium titanate), niobium oxide, and niobium-containing composite oxide. Since these oxidized compounds have a specific gravity close to that of the compound contained in the active substance according to the first embodiment and are easily mixed and dispersed, they are appropriately used.

The conductive agent improves the current collection performance of the active material and suppresses the contact resistance with the current collector. Examples of the conductive agent include carbonaceous substances such as acetylene black, carbon black, and graphite.

The binder is added to fill gaps among the dispersed negative electrode active material particles and binds the active material to the conductive agent. Examples of the binder include polytetrafluoroethylene (PTFE), polyvinylidene fluoride (PVdF), fluorine-based rubber, and styrene butadiene rubber.

Preferably, blending rates of the active material, the conductive agent, and the binder in the negative electrode material layer are in a range of 68 wt % to 96 wt %, a range of 2 wt % to 30 wt %, and a range of 2 wt % to 30 wt %, respectively. If the amount of the conductive agent is 2 wt % or more, the current collection performance of the negative electrode material layer becomes good. If the amount of the binder is 2 wt % or more, the binding property of the negative electrode material layer and the current collector is sufficient, and excellent cycle characteristics can be expected. On the other hand, the amount of the binder is preferably 30 wt % or less in view of the improvement in the capacity of the nonaqueous electrolyte battery.

A material which is electrochemically stable at the lithium absorption-release potential of the negative electrode active material is used for the current collector. The current collector is preferably formed of copper, nickel, stainless steel or aluminium, or an aluminium alloy containing an element or elements such as Mg, Ti, Zn, Mn, Fe, Cu or Si. The thickness of the current collector is preferably from 5 μm to 20 μm. The current collector having such a thickness can achieve a strong, lightweight negative electrode.

For example, the negative electrode may be produced as follows. At first, the active material, the conductive agent, and the binder are suspended in a widely used solvent to prepare slurry. Next, the slurry is applied to the current collector to form a coated film. And then, the film is dried to form a negative electrode material layer. Finally, the dried film is pressed so that the negative electrode is obtained. Alternatively, the negative electrode may also be produced by forming a pellet comprising the active material, the conductive agent, and the binder to produce a negative electrode material layer and placing the layer on the current collector.

3) Nonaqueous Electrolyte

The nonaqueous electrolyte may be, for example, a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethasulfonate ($LiCF_3SO_3$), a lithium salt such as lithium bis(trifluoromethylsulfonyl) imide [$LiN(CF_3SO_2)_2$], and the mixtures thereof. The electrolyte is preferably one is not easily oxidized even at a high potential and is the most preferable.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); and γ-butyrolactone (GBL), acetonitrile (AN), and sulfolane (SL). These organic solvents can be used alone or in the form of a mixed solvent.

Examples of the polymer material include polyvinylidene fluoride (PVdF), polyacrylonitrile (PAN), and polyethylene oxide (PEO).

Alternatively, an ordinary temperature molten salt containing lithium ions (ionic melt), polymer solid electrolyte, inorganic solid electrolyte and the like may be used as the nonaqueous electrolyte.

The ordinary temperature molten salt (ionic melt) means compounds which can exist in a liquid state at normal temperature (15° C. to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. The melting point of the ordinary temperature molten salt to be usually used for the nonaqueous electrolyte battery is generally 25° C. or less. Further, the organic cation has generally a quaternary ammonium skeleton.

The polymer solid electrolyte is prepared by dissolving an electrolyte in a polymer material and by solidifying the mixture.

The inorganic solid electrolyte is a solid material having lithium ion-conductivity.

4) Separator

The separator may be formed of a porous film containing a material such as polyethylene, polypropylene, cellulose or polyvinylidene fluoride (PVdF), or a synthetic resin-based nonwoven fabric. Particularly, a porous film formed of polyethylene or polypropylene melts at a constant temperature and can block electric current, and thus it is preferred from the viewpoint of improvement in safety.

5) Container

As the container, a container formed of a laminate film having a thickness of 0.5 mm or less or a container formed of metal having a thickness of 1 mm or less can be used. The thickness of the laminate film is more preferably 0.2 mm or less. The thickness of the metal container is preferably 0.5 mm or less, more preferably 0.2 mm or less.

Examples of the shape of the container include a flat type (thin type), rectangular type, cylindrical type, coin type, and button type. The container may be, for example, a container for a small battery which is loaded into a portable electronic device or a container for a large battery which is loaded into a two- or four-wheeled vehicle depending on the size of the battery.

As the laminate film, a multilayer film in which a metal layer is sandwiched between resin layers is used. The metal layer is preferably aluminum foil or aluminum alloy foil in order to reduce the weight. Polymer materials such as polypropylene (PP), polyethylene (PE), nylon, and polyethylene terephthalate (PET) can be used for the resin layer. The laminate film can be formed into a shape of the container by heat sealing.

The metal container is formed from aluminium or an aluminium alloy. It is preferable that the aluminium alloy includes an element or elements such as magnesium, zinc, and silicon. When transition metals such as iron, copper, nickel, and chromium are contained in the alloy, the content is preferably 1 wt % or less. Thus, the long-term reliability in the hot environment and heat-releasing property can be dramatically improved.

Subsequently, an example of the nonaqueous electrolyte battery according to the second embodiment will be more specifically described with reference to the drawings.

Figure 4:
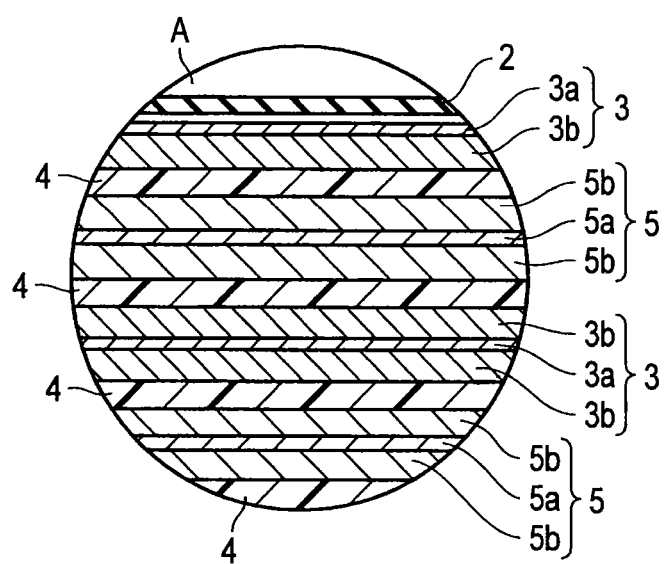
FIG. 4 is an enlarged sectional view of an A portion of FIG. 3.

FIG. 3 is a cross-sectional view of a flat-shaped nonaqueous electrolyte battery according to a second embodiment. FIG. 4 is an enlarged sectional view of an A portion of FIG. 3. Each drawing is a schematic one to facilitate the description of the present embodiment and its understanding. The shape, size, and ratio thereof are different from those of an actual device. However, they can be appropriately designed and modified by taking into consideration the following description and known techniques.

A nonaqueous electrolyte battery 10 shown in FIGS. 3 and 4 includes a flat-shaped wound electrode group 1. As shown in FIG. 3, the flat-shaped wound electrode group 1 is housed in a bag-shaped container 2 formed of a laminate film in which a metal layer is sandwiched between two resin layers. The flat-shaped wound electrode group 1 is formed by spirally winding a laminate obtained by stacking a negative electrode 3, a separator 4, a positive electrode 5, and the separator 4 in this order from the outside and subjecting it to press-molding.

As shown in FIG. 4, the negative electrode 3 includes a negative electrode current collector 3a and a negative electrode material layer 3b. The active substance for a battery according to the first embodiment is contained in the negative electrode material layer 3b. As shown in FIG. 4, the negative electrode 3 on the outermost layer has a configuration in which the negative electrode material layer 3b is formed on only one surface, facing inwardly, of the negative electrode current collector 3a. In other negative electrodes 3, the negative electrode material layer 3b is formed on both surfaces of the negative electrode current collector 3a.

As shown in FIG. 4, in the positive electrode 5, the positive electrode material layer 5b is formed on both surfaces of the positive electrode current collector 5a. The positive electrode material layer 5b is opposed to the negative electrode material layer 3b via the separator 4.

As shown in FIG. 3, in a vicinity of a peripheral edge of the wound electrode group 1, a negative electrode terminal 6 is connected to the negative electrode current collector 3a of the negative electrode 3 of an outermost shell layer, and a positive electrode terminal 7 is connected to the positive electrode current collector 5a of the positive electrode 5 at the core. The negative electrode terminal 6 and the positive electrode terminal 7 are extended outwardly from an opening of the bag-shaped container 2. For example, the liquid nonaqueous electrolyte is injected from the opening of the bag-shaped container 2. The wound electrode group 1 and the liquid nonaqueous electrolyte can be completely sealed by heat-sealing the opening of the bag-shaped container 2 across the negative electrode terminal 6 and the positive electrode terminal 7.

The negative electrode terminal 6 is formed from a material which is electrically stable in Li absorption-release potential of the negative electrode active material and has conductivity. Specifically, it is formed of copper, nickel, stainless steel or aluminum, or an aluminum alloy containing an element or elements such as Mg, Ti, Zn, Mn, Fe, Cu, and Si. It is preferable that the negative electrode terminal 6 is formed of a material similar to that of the negative electrode current collector 3a in order to reduce the contact resistance with the negative electrode current collector.

The positive electrode terminal 7 is formed of, for example, a material which is electrically stable in a potential range of 3 V to 5 V (vs. Li/Li$^+$), and preferably 3.0 V to 4.25 V (vs. Li/Li$^+$) and has conductivity. Specifically, it is formed of aluminium or an aluminium alloy containing elements such as Mg, Ti, Zn, Ni, Cr, Mn, Fe, Cu, and Si. It is preferable that the positive electrode terminal is formed of the same material as that of the positive electrode current collector 5a in order to reduce the contact resistance with the positive electrode current collector 5a.

The configuration of the nonaqueous electrolyte battery according to the second embodiment is not limited to the configurations shown in FIGS. 3 and 4. The nonaqueous electrolyte battery according to the second embodiment may also have, for example, configurations shown in FIGS. 5 and 6.

FIG. 5 is a partially cut perspective view schematically showing another flat-shaped nonaqueous electrolyte battery according to the second embodiment. FIG. 6 is an enlarged sectional view of a B portion of FIG. 5.

The nonaqueous electrolyte battery 10 shown in FIGS. 5 and 6 comprises a lamination-type electrode group 11. As shown in FIG. 5, the lamination-type electrode group 11 is housed in an exterior member 12 which is formed of a laminate film in which a metal layer is sandwiched between two resin films. As shown in FIG. 6, the lamination-type electrode group 11 has a structure in which a positive electrode 13 and a negative electrode 14 are alternately stacked while a separator 15 is sandwiched between the both electrodes. A plurality of the positive electrodes 13 are present. Each of the positive electrodes 13 includes the current collector 13a and a positive electrode active material containing layer 13b formed on both surfaces of the current collector 13a. A plurality of the negative electrodes 14 are present. Each of the negative electrodes 14 includes a negative electrode current collector 14a and a negative electrode active material containing layer 14b formed on both surfaces of the negative electrode current collector 14a. In each of the negative electrode current collectors 14a of the negative electrodes 14, a side is protruded from the negative electrode 14. The protruded negative electrode current collector 14a is electrically connected to a belt-like negative electrode terminal 16. The distal end of the negative electrode terminal 16 is externally drawn from the case 11. In the positive electrode current collector 13a of the positive electrode 13, not illustrated, one side located at the opposite side against the protruded side of the negative electrode current collector 14a is protruded from the positive electrode 13. The positive electrode current collector 13a protruded from the positive electrode 13 is electrically connected to a belt-like positive electrode terminal 17. The distal end of the belt-like positive electrode terminal 17 is located at the opposite side of the negative electrode terminal 16 and externally drawn from the case 11.

The nonaqueous electrolyte battery according to the second embodiment comprises the negative electrode which includes the active substance for a battery according to the first embodiment. Therefore, the nonaqueous electrolyte battery according to the second embodiment can exhibit a high capacity and improved rapid charge and discharge characteristics.

(Third Embodiment)

According to the third embodiment, there is provided a battery pack. The battery pack according to the third embodiment includes the nonaqueous electrolyte battery according to the second embodiment.

The battery pack according to the third embodiment includes one or a plurality of nonaqueous electrolyte batteries (unit cells) according to the second embodiment. When a plurality of the unit cells are included, each of the unit cells is electrically connected in series or in parallel.

Subsequently, the battery pack according to the third embodiment will be described with reference to the drawings.

Figure 7:
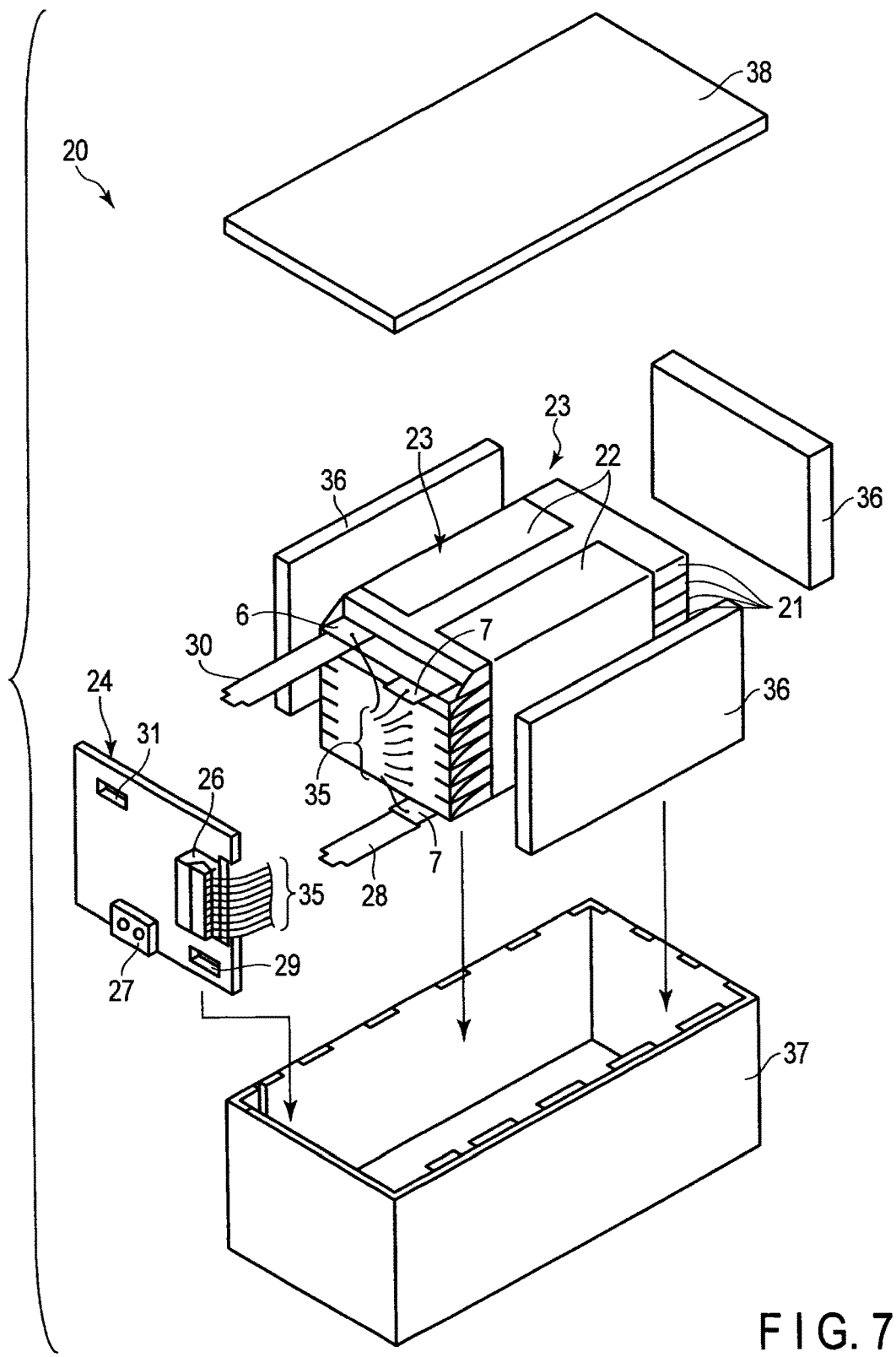
FIG. 7 is an exploded perspective view of a battery pack according to a third embodiment.
Figure 8:
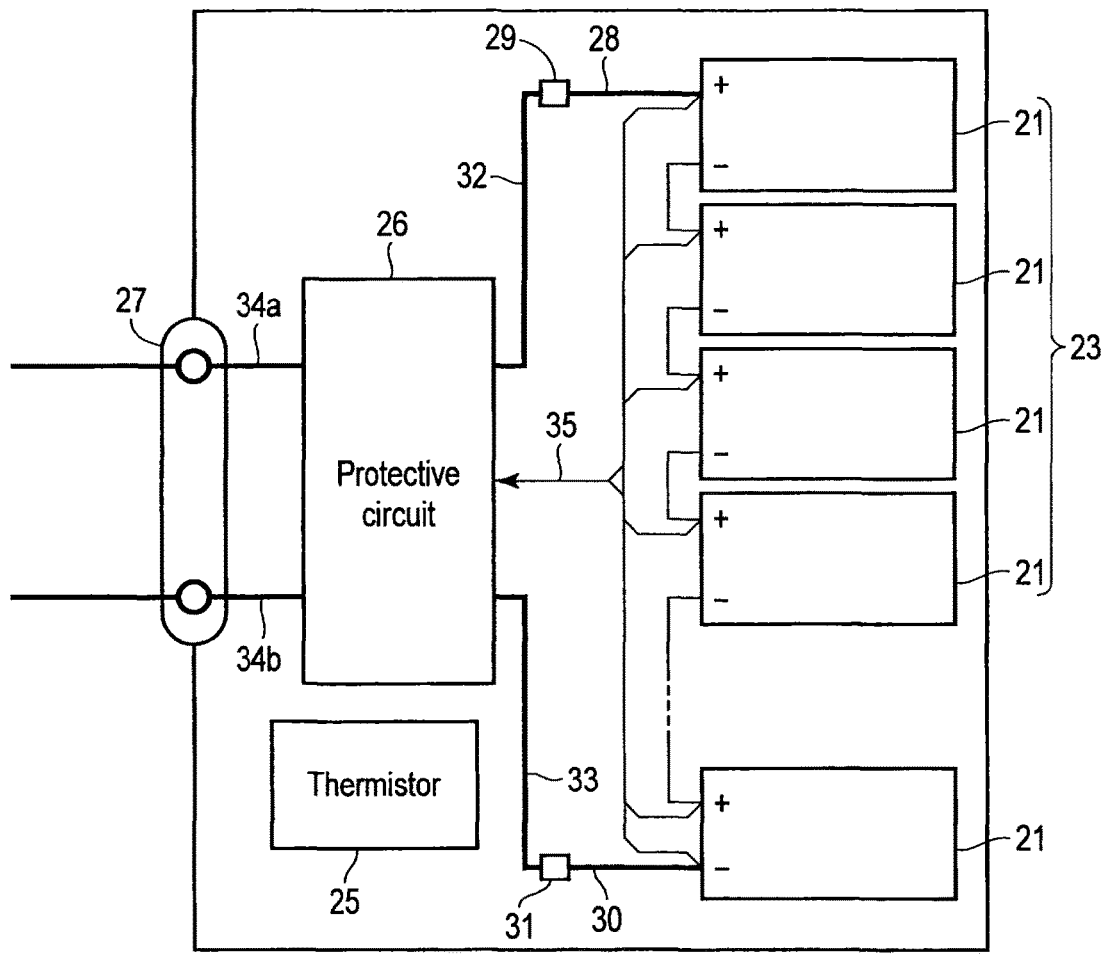
FIG. 8 is a block diagram showing the electric circuit of the battery pack of FIG. 7.

FIG. 7 is an exploded perspective view of a battery pack according to a third embodiment. FIG. 8 is a block diagram showing the electric circuit of the battery pack of FIG. 7.

A battery pack 20 shown in FIGS. 7 and 8 comprises a plurality of unit cells 21. The unit cell 21 is the nonaqueous electrolyte battery 10 shown in FIGS. 3 and 4.

As shown in FIG. 7, a battery module 23 is configured by stacking the unit cells 21 so that a negative electrode terminal 6 extended outside and a positive electrode terminal 7 are arranged in the same direction and fastening them with an adhesive tape 22. The unit cells 21 are electrically connected in series with one another as shown in FIG. 8. The unit cells 21 electrically connected in series form the battery module 23.

As shown in FIG. 7, a printed wiring board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed wiring board 24 as shown in FIG. 8. An electric insulating plate (not shown) is attached to the plane of the protective circuit board 24 facing the battery module 23 to avoid unnecessary connection of the wiring of the battery module 23.

As shown in FIG. 8, a positive electrode-side lead 28 is connected to the positive electrode terminal 7 located at the bottom layer of the battery module 23 and the distal end is inserted into a positive electrode-side connector 29 of the printed wiring board 24 so as to be electrically connected. A negative electrode-side lead 30 is connected to the negative electrode terminal 6 located at the top layer of the battery module 23 and the distal end is inserted into a negative electrode-side connector 31 of the printed wiring board 24 so as to be electrically connected. The connectors 29 and 31 are connected to the protective circuit 26 through wirings 32 and 33 formed in the printed wiring board 24.

The thermistor 25 is used to detect the temperature of the unit cells 21. The detection signal is sent to the protective circuit 26. The protective circuit 26 can shut down a plus-side wiring 34a and a minus-side wiring 34b between the protective circuit 26 and the energizing terminal 27 to an external instrument under a predetermined condition. The predetermined condition as an example is the case when the detection temperature of the thermistor 25 becomes more than a predetermined temperature. Further, the predetermined condition as another example is the case when the over-charge, over-discharge, and over-current of the unit cells 21 are detected. The detection of the over-charge may be performed on each of the unit cells 21 or the whole of the battery module 23. When the over-charge of each of the unit cells 21 is detected, the voltage of each of the cell units may be detected or the potential of the positive electrode or the negative electrode may be detected. In the case of the latter, a lithium electrode to be used as a reference electrode is inserted into each of the unit cells 21. In the case of the nonaqueous electrolyte battery shown in FIGS. 7 and 8, wiring 35 for voltage detection is connected to each of the unit cells 21 and detection signals are sent to the protective circuit 26 through the wirings 35.

As shown in FIG. 7, protective sheets 36 comprised of rubber or resin are arranged on three side surfaces of the battery module 23 except the side surface from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, winding a heat-shrinkable tape around such, and thermally shrinking the heat-shrinkable tape.

In FIGS. 7 and 8, the form in which the unit cells 21 are connected in series is shown. However, in order to increase the capacity, the cells may be connected in parallel. Alternatively, the cells may be formed by combining series connection and parallel connection. A plurality of the assembled battery packs can be connected in series or in parallel.

The form of the battery pack according to the third embodiment is appropriately changed according to the use. The battery pack according to the third embodiment is used suitably for the application which requires the excellent cycle characteristics when a high current is taken out. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

The battery pack according to the third embodiment includes the nonaqueous electrolyte battery according to the second embodiment. Therefore, the battery pack according to the third embodiment can have a high capacity and improved rapid charge and discharge characteristics.

EXAMPLE

Hereinafter, examples will be described. However, the present invention is not limited to the following examples without departing from the spirit of the present invention.

Example 1

As starting materials, a solution of titanyl sulfate in diluted sulfuric acid and a solution of niobium chloride in ethanol were used. Both the solutions were mixed so that the molar ratio (Nb/Ti) was 7:3. The pH of the mixed solution was adjusted to 8 with an ammonia solution while stirring it.

The obtained solution was transferred to an autoclave container, followed by heating at 170° C. for 5 hours. The obtained solution was filtered and washed with pure water to obtain precursor particles.

The structure of the obtained precursor particles was confirmed using the X-ray diffraction measurement. As a result, it was found that the halo peak in the precursor particles was observed and they were in an amorphous state.

Subsequently, the obtained precursor particles were subjected to sintering in air at 1100° C. for 12 hours. After the sintering, additional sintering in air at 600° C. for 5 hours was performed. In this way, active material particles were synthesized.

The composition of the obtained active material particles was analyzed by ICP analysis. The composition of the active material particles was $Ti_{0.965}Nb_{2.035}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M1=Nb and y=0

Wide-angle X-ray diffraction measurement was performed on the obtained active material particles. As for the measurement conditions, the sampling interval was set to 0.01° and the scanning speed was set to 2°/min. The X-ray diffraction pattern obtained by the measurement is shown in FIG. 9.

Figure 9:
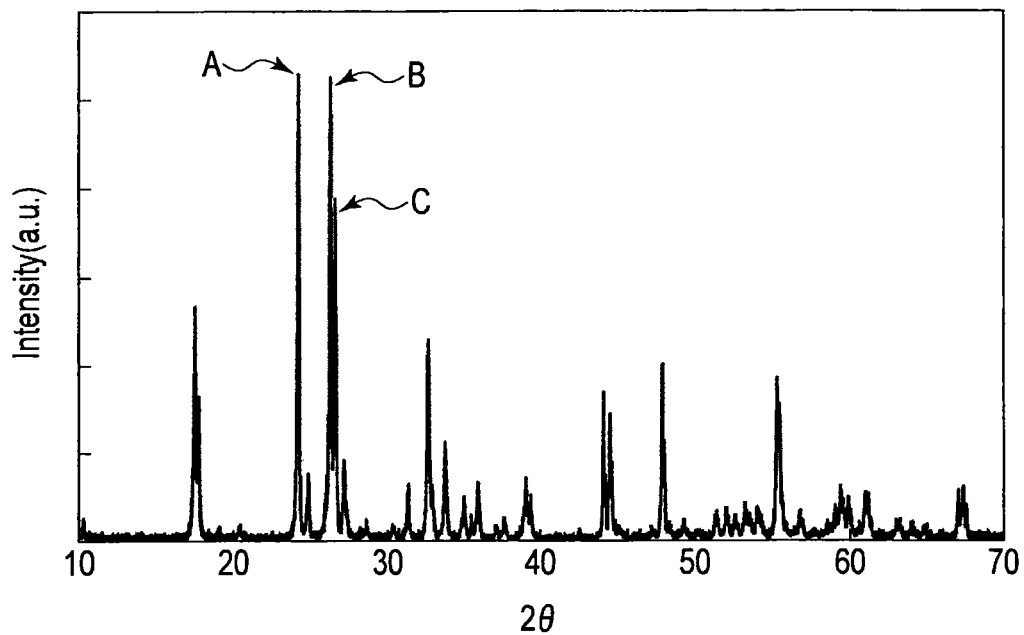
FIG. 9 is a wide-angle X-ray diffraction pattern of active material particles of Example 1.

As shown in FIG. 9, three characteristic peaks appeared in the diffraction pattern obtained by the wide-angle X-ray diffraction method. Specifically, the peak A appears at 2θ=24.01°, the peak B appeared at 2θ=26.06°, and the peak C appeared at 2θ=26.37°. Peak intensity ratios $I_B/I_A$ and $I_C/I_B$ are shown in Table 1 below.

The obtained diffraction pattern was confirmed using the JCPDS card. Then, it was confirmed that the obtained active material particles had the same crystal structure as that of the monoclinic oxide $TiNb_2O_7$: JCPDS card 70-2009. The attribution of three characteristic peaks was determined with reference to Liquan Chen et al., Energy & Environmental Science, 2011, 4, 2638-2644. As a result, the peak A was attributed to the (110) plane, the peak B was attributed to the (003) plane, and the peak C was attributed to the ($\bar{6}$02) plane.

Subsequently, 100 mass % of the obtained active material particles, 10 mass % of acetylene black and 10 mass % of carbon nanofiber as a conductive aid, and 10 mass % of polyvinylidene fluoride (PVdF) as a binder were added to N-methyl pyrrolidone (NMP), and mixed to prepare a slurry. Subsequently, this slurry was applied to one surface of a current collector formed of 12-μm-thick aluminum foil and dried, followed by pressing to produce an electrode having a coating weight of 25 g/cm².

On the other hand, 1 mol/L of lithium bis pentafluoroethane sulfonyl amide $Li(C_2F_5SO_2)_2N$ (LiTFSI) as a supporting electrolyte is dissolved in a mixed solvent obtained by mixing ethylene carbonate (EC) and diethyl carbonate (DEC) at a volume ratio of 1:2 to prepare a nonaqueous electrolyte solution.

The electrode thus obtained was used as a working electrode, and Li metal was used as a counter electrode and a reference electrode, and the electrolyte solution thus prepared was used to produce a three-electrode-type beaker cell.

The three-electrode-type beaker cell thus produced was used to evaluate the charge and discharge characteristics. In the evaluation, the first cycle discharge capacity (m Ah/g) at 0.2 C per 1 g of active material particles and the discharge capacity (mAh/g) at 20 C per 1 g of active material particles were measured under the condition that the evaluation temperature was 25° C. and the cutoff potential was from 3.0 V to 1.0 V (vs. Li/Li$^+$).

The first cycle discharge capacity at 0.2 C per 1 g of the active material particles was 285.20 mAh/g. The ratio of the discharge capacity at 20 C to the discharge capacity at 0.2 C was 86.49%.

Example 2

In this example, active material particles were obtained in the same manner as Example 1.

The crystal structure of the precursor particles before subjecting to sintering was confirmed using the X-ray diffraction measurement. As a result, it was found that the halo peak in the precursor particles was observed and they were in an amorphous state.

The composition of the obtained active material particles was analyzed by ICP analysis. The composition of the active material particles was $Ti_{0.965}Nb_{2.035}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M=Nb and y=0.

Subsequently, the obtained active material particles were coated with carbon by the following procedure. First, the active material particles were added to a solution containing 30 wt % of sucrose based on the weight of the active material particles, followed by stirring and mixing. Thereafter, the mixture was heated to evaporate water. Subsequently, the mixture was sintered in an Ar atmosphere at 600° C. for 5 hours to obtain a target active material.

When the obtained active material was confirmed from the SEM image, the segregation of the carbon agent was not observed. Further, the peak from the carbon was observed by EPMA analysis. Thus, it was confirmed that the surface of the material particles was covered with the carbon material.

Sintering in air at 1000° C. for 5 hours was performed and then the amount of carbon coating was calculated from the difference between the weights before and after the sintering. The amount of carbon coating in this example was 8.02 wt % based on the total weight of the active material including the carbon coating.

Wide-angle X-ray diffraction measurement was performed on the obtained active material coated with carbon. The measurement conditions were the same as Example 1. The X-ray diffraction pattern obtained by the measurement is shown in FIG. 10.

Figure 10:
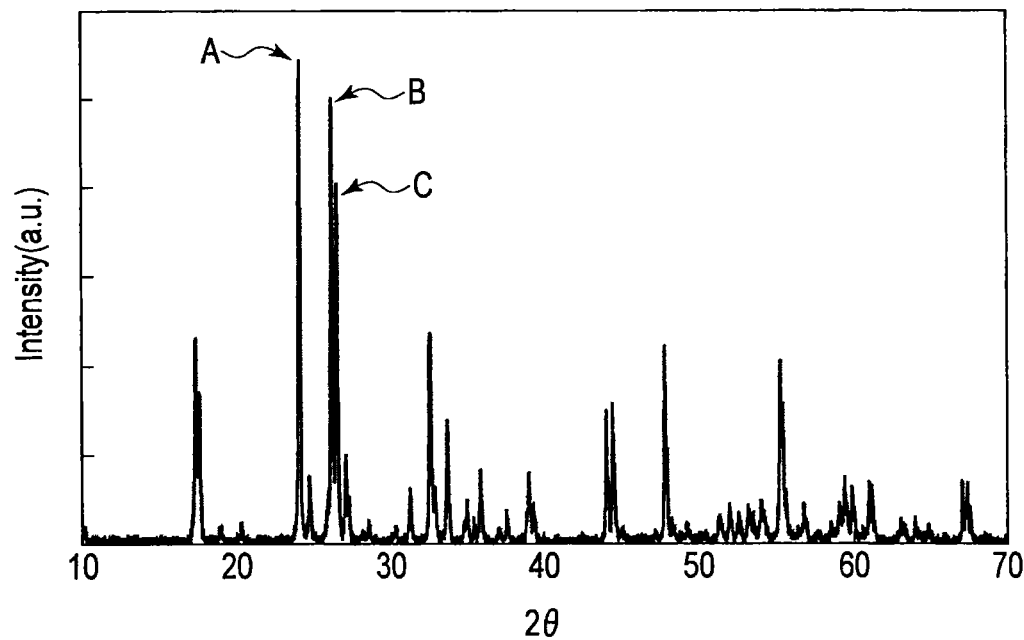
FIG. 10 is a wide-angle X-ray diffraction pattern of active material particles of Example 2.

As shown in FIG. 10, in the diffraction pattern obtained by the wide-angle X-ray diffraction method, the peak A appeared at 2θ=24.1°, the peak B appeared at 2θ=26.16°, and the peak C appeared at 2θ=26.48°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 2 are shown in Table 1 below.

Example 3

Active material particles were synthesized in the same manner as Example 1 except that the composition of the active material particles was changed in the overall process of synthesis of the precursor in this example.

The composition of the active material particles was changed by mixing a solution of titanyl sulfate in diluted sulfuric acid and a solution of niobium chloride in ethanol as starting materials so that the molar ratio (Nb/Ti) was 43:17.

The crystal structure of the precursor particles before subjecting to sintering was confirmed using the X-ray diffraction measurement. As a result, it was found that the halo peak in the precursor particles was observed and they were in an amorphous state.

The composition of the obtained active material particles was analyzed by ICP analysis. The composition of the active material particles was $Ti_{0.915}Nb_{2.085}O_7$. The composition is the composition represented by the formula $Ti_{1-x}M_xNb_2O_7$, where x=0.085 and M=Nb. The composition can be also represented by the formula $Ti_{1-x}M1_xNb_{2-y}M2_yO_7$, where x=0.085, M=Nb and y=0.

Subsequently, the obtained active material particles were coated with carbon by the same procedure as Example 2 to obtain a target active material. When the obtained active material was confirmed from the SEM image, the segregation of the carbon agent was not observed. Further, the peak from the carbon was observed by EPMA analysis. Thus, it was confirmed that the surface of the material particles was covered with the carbon material.

The coating amount of carbon was calculated using the same procedure as Example 2. The coating amount of carbon in this example was 7.98 wt % based on the total weight of the active material including the coating amount of carbon.

Wide-angle X-ray diffraction measurement was performed on the obtained active material coated with carbon. The measurement conditions were the same as Example 1. The X-ray diffraction pattern obtained by the measurement is shown in FIG. 11.

As shown in FIG. 11, in the diffraction pattern obtained by the wide-angle X-ray diffraction method, the peak A appeared at 2θ=24.03°, the peak B appeared at 2θ=26.09°, and the peak C appeared at 2θ=26.42°. Peak intensity ratios $I_B/I_A$ and $I_C/I_B$ are shown in Table 1 below.

The production method of electrode and the evaluation method were performed in the same manner as Example 1. The first cycle discharge capacity at 0.2 C per 1 g of the active material and the ratio of the discharge capacity at 20 C to the discharge capacity at 0.2 C in Example 3 are shown in Table 1 below.

Example 4

Active material particles were synthesized in the same manner as Example 1 except that the composition of the active material particles was changed in the overall process of synthesis of the precursor in this example.

The crystal structure of the precursor particles before subjecting to sintering was confirmed using the X-ray diffraction measurement. As a result, it was found that the halo peak in the precursor particles was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 2.21:1.

The composition of the obtained active material particles was analyzed by ICP analysis. The composition of the active material particles was $TiNb_2O_7$. This composition is represented by the formula $Ti_{1-x}M_xNb_2O_7$, where x=0. This composition can be also represented by the formula $Ti_{1-x}M1_xNb_{2-y}M2_yO_7$, where x=0 and y=0.

Subsequently, the obtained active material particles were coated with carbon by the same procedure as Example 2 to obtain a target active material. When the obtained active material was confirmed from the SEM image, the segregation of the carbon agent was not observed. Further, the peak from the carbon was observed by EPMA analysis. Thus, it was confirmed that the surface of the material particles was covered with the carbon material.

The coating amount of carbon was calculated using the same procedure as Example 2. The coating amount of carbon in this example was 8.23 wt % based on the total weight of the active material including the carbon material.

Wide-angle X-ray diffraction measurement was performed on the obtained active material coated with carbon. The measurement conditions were the same as Example 1. The X-ray diffraction pattern obtained by the measurement is shown in FIG. 12.

As shown in FIG. 12, in the diffraction pattern obtained by the wide-angle X-ray diffraction method, the peak A appeared at 2θ=24.01°, the peak B appeared at 2θ=26.07°, and the peak C appeared at 2θ=26.40°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 4 are shown in Table 1 below.

Example 5

Active material particles were synthesized in the same manner as Example 1 except that the sintering was performed at 1100° C. for 1 hour in this example.

The crystal structure of the precursor particles before subjecting to sintering was confirmed using the X-ray diffraction measurement. As a result, it was found that the halo peak in the precursor particles was observed and they were in an amorphous state.

The composition of the obtained active material particles was analyzed by ICP analysis. The composition of the active material particles was $Ti_{0.965}Nb_{2.035}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M1=Nb and y=0

Subsequently, the obtained active material particles were coated with carbon by the same method as Example 2 to obtain a target active material. When the obtained active material was confirmed from the SEM image, the segregation of the carbon agent was not observed. Further, the peak from the carbon was observed by EPMA analysis. Thus, it was confirmed that the surface of the material particles was covered with the carbon material.

The coating amount of carbon was calculated using the same procedure as Example 2. The coating amount of carbon in this example was 8.21 wt % based on the total weight of the active material including the coating amount of carbon.

Wide-angle X-ray diffraction measurement was performed on the obtained active material coated with carbon. The measurement conditions were the same as Example 1. The X-ray diffraction pattern obtained by the measurement is shown in FIG. 13.

As shown in FIG. 13, in the diffraction pattern obtained by the wide-angle X-ray diffraction method, the peak A appeared at 2θ=23.92°, the peak B appeared at 2θ=25.98°, and the peak C appeared at 2θ=26.31°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 5 are shown in Table 1 below.

Example 6

Active material particles were synthesized in the same manner as Example 1 except that the sintering was performed at 700° C. for 1 hour in this example.

The crystal structure of the precursor particles before subjecting to sintering was confirmed using the X-ray diffraction measurement. As a result, it was found that the halo peak was observed in the precursor and it was in an amorphous state.

The composition of the obtained active material particles was analyzed by ICP analysis. The composition of the active material particles was $Ti_{0.965}Nb_{2.035}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M1=Nb and y=0

Subsequently, the obtained active material particles were coated with carbon by the same method as Example 2 to obtain a target active material. When the obtained active material was confirmed from the SEM image, the segregation of the carbon agent was not observed. Further, the peak from the carbon was observed by EPMA analysis. Thus, it was confirmed that the surface of the material particles was covered with the carbon material.

The coating amount of carbon was calculated using the same procedure as Example 2. The coating amount of carbon in this example was 8.51 wt % based on the total weight of the active material including the coating amount of carbon.

Wide-angle X-ray diffraction measurement was performed on the obtained active material coated with carbon. The measurement conditions were the same as Example 1. The X-ray diffraction pattern obtained by the measurement is shown in FIG. 14.

As shown in FIG. 14, in the diffraction pattern obtained by the wide-angle X-ray diffraction method, the peak A appeared at 2θ=23.92° and the peak B appeared at 2θ=25.98°. The peak C was difficult to visually confirm and it was determined as "none". Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 6 are shown in Table 1 below.

Example 7

Active material particles were synthesized in the same manner as Example 3 except that carbon coating was not performed in this example.

The crystal structure of the precursor particles before subjecting to sintering was confirmed using the X-ray diffraction measurement. As a result, it was found that the halo peak in the precursor particles was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 43:17.

The composition of the obtained active material particles was analyzed by ICP analysis. The composition of the active material particles was $Ti_{0.915}Nb_{2.085}O_7$. This composition is represented by the formula $Ti_{1-x}M_xNb_2O_7$, where x=0.085 and M=Nb. This composition can be also represented by the formula $Ti_{1-x}M1_xNb_{2-y}M2_yO_7$, where x=0.085, M1=Nb and y=0.

Wide-angle X-ray diffraction measurement was performed on the obtained active material. The measurement conditions were the same as Example 1. The X-ray diffraction pattern obtained by the measurement is shown in FIG. 15.

Figure 15:
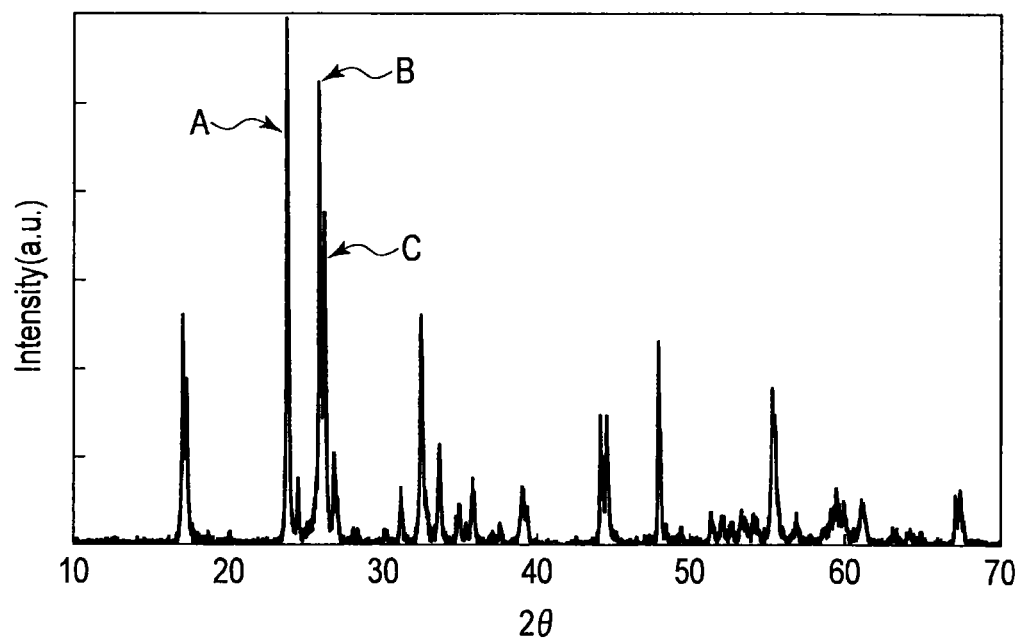
FIG. 15 is a wide-angle X-ray diffraction pattern of active material particles of Example 7.

As shown in FIG. 15, in the diffraction pattern obtained by the wide-angle X-ray diffraction method, the peak A appeared at 2θ=23.95°, the peak B appeared at 2θ=25.99°, and the peak C appeared at 2θ=26.34°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 7 are shown in Table 1 below.

Example 8

Active material particles were synthesized in the same manner as Example 4 except that carbon coating was not performed in this example.

The crystal structure of the precursor particles before subjecting to sintering was confirmed using the X-ray diffraction measurement. As a result, it was found that the halo peak in the precursor particles was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 2.21:1.

The composition of the obtained active material particles was analyzed by ICP analysis. The composition of the active material particles was $TiNb_2O_7$. This composition is represented by the formula $Ti_{1-x}M_xNb_2O_7$, where x=0. This composition can be also represented by the formula $Ti_{1-x}M1_xNb_{2-y}M2_yO_7$, where x=0 and y=0

Wide-angle X-ray diffraction measurement was performed on the obtained active material. The measurement conditions were the same as Example 1. The X-ray diffraction pattern obtained by the measurement is shown in FIG. 16.

Figure 16:
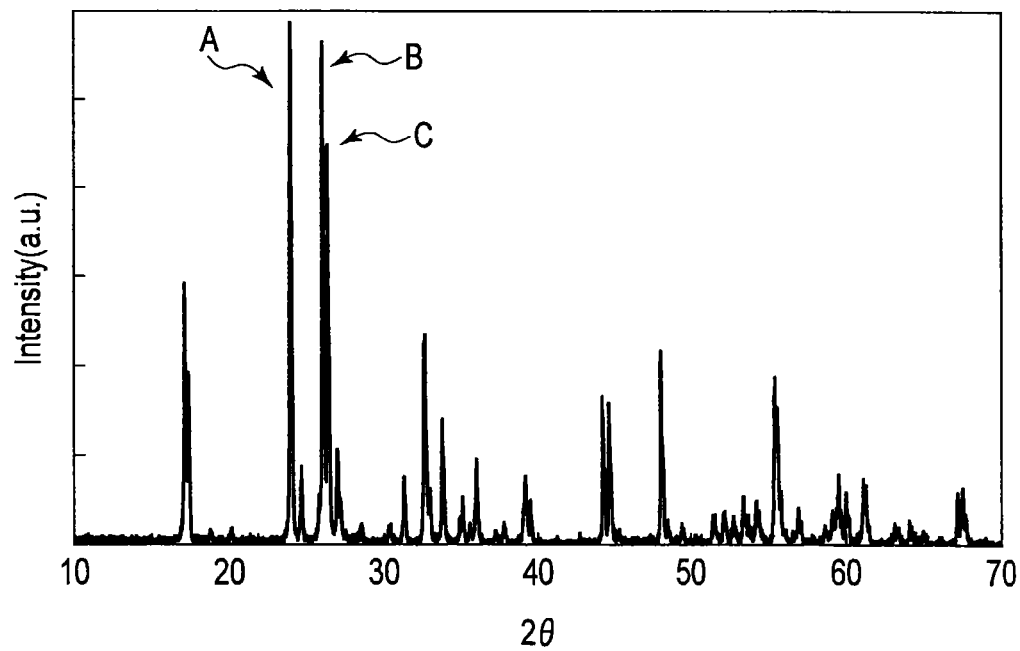
FIG. 16 is a wide-angle X-ray diffraction pattern of active material particles of Example 8.

As shown in FIG. 16, in the diffraction pattern obtained by the wide-angle X-ray diffraction method, the peak A appeared at 2θ=23.96°, the peak B appeared at 2θ=26.02°, and the peak C appeared at 2θ=26.34°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 8 are shown in Table 1 below.

Example 9

Active material particles were synthesized in the same manner as Example 5 except that carbon coating was not performed in this example.

The crystal structure of the precursor particles before subjecting to sintering was confirmed using the X-ray diffraction measurement. As a result, it was found that the halo peak in the precursor particles was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 7:3.

The composition of the obtained active material particles was analyzed by ICP analysis. The composition of the active material particles was $Ti_{0.965}Nb_{2.05}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M1=Nb and y=0.

Wide-angle X-ray diffraction measurement was performed on the obtained active material. The measurement conditions were the same as Example 1. The X-ray diffraction pattern obtained by the measurement is shown in FIG. 17.

As shown in FIG. 17, in the diffraction pattern obtained by the wide-angle X-ray diffraction method, the peak A appeared at 2θ=24.02°, the peak B appeared at 2θ=26.05°, and the peak C appeared at 2θ=26.38°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 9 are shown in Table 1 below.

Example 10

Active material particles were synthesized in the same manner as Example 6 except that carbon coating was not performed in this example.

The crystal structure of the precursor particles before subjecting to sintering was confirmed using the X-ray diffraction measurement. As a result, it was found that the halo peak in the precursor particles was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 7:3.

The composition of the obtained active material particles was analyzed by ICP analysis. The composition of the active material particles was $Ti_{0.965}Nb_{2.035}O_7$. This composition is represented by the formula $Ti_{1-x}M_xNb_2O_7$, where x=0.035 and M=Nb. This composition can be also represented by the formula $Ti_{1-x}M1_xNb_{2-y}M2_yO_7$, where x=0.035, M1=Nb and y=0.

Wide-angle X-ray diffraction measurement was performed on the obtained active material. The measurement conditions were the same as Example 1. The X-ray diffraction pattern obtained by the measurement is shown in FIG. 18.

As shown in FIG. 18, in the diffraction pattern obtained by the wide-angle X-ray diffraction method, the peak A appeared at 2θ=24.09 and the peak B appeared at 2θ=25.91°. The peak C was difficult to visually confirm and it was determined as "none". Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material and the ratio of the discharge capacity at 20 C to the discharge capacity at 0.2 C in Example 10 are shown in Table 1 below.

Comparative Example 1

Active material particles ($TiNb_2O_7$) were synthesized by the solid phase method according to the method described in JP-A 2010-287496 (KOKAI).

Titanium oxide and niobium oxide as starting materials were weighed so as to have a molar ratio of 1:1. These materials were placed in a mortar and ethanol was added thereto and mixed. Then, the mixture was put into an alumina crucible, followed by heat treatment in atmospheric air at 1000° C. for 24 hours using an electric furnace. After natural cooling, the resulting mixture was ground and mixed in the mortar to obtain a precursor.

Subsequently, the precursor was subjected to heat treatment at 1000° C. for 24 hours to synthesize active material particles. That is, in Comparative example 1, the heat treatment was performed for a total time of 48 hours.

The composition of the obtained active material particles was analyzed by ICP analysis. The composition of the active material particles was $TiNb_2O_7$. This composition is represented by the formula $Ti_{1-x}M_xNb_2O_7$, where x=0. This composition can be also represented by the formula $Ti_{1-x}M1_xNb_{2-y}M2_yO_7$, where x=0 and y=0.

Wide-angle X-ray diffraction measurement was performed on the obtained active material particles. The measurement conditions were the same as Example 1. The X-ray diffraction pattern obtained by the measurement is shown in FIG. 19.

Figure 19:
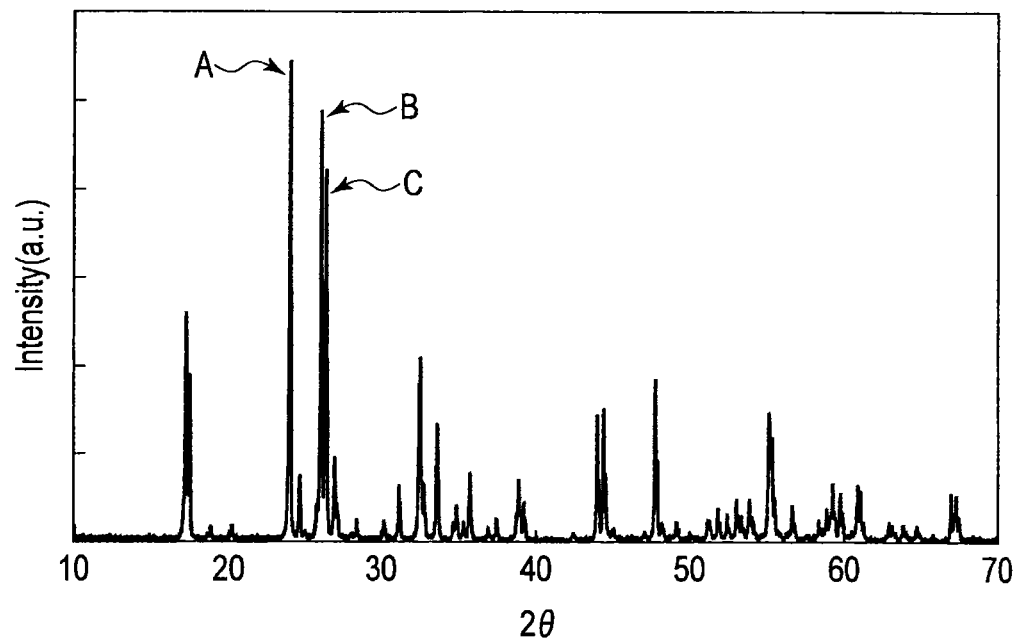
FIG. 19 is a wide-angle X-ray diffraction pattern of active material particles of Comparative example 1.

As shown in FIG. 19, in the diffraction pattern obtained by the wide-angle X-ray diffraction method, the peak A appeared at 2θ=23.98°, the peak B appeared at 2θ=26.04°, and the peak C appeared at 2θ=26.36°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material particles and the ratio of the discharge capacity at 20 C to the discharge capacity at 0.2 C in Comparative example 1 are shown in Table 1 below.

Comparative Example 2

Active material particles were synthesized in the same manner as Comparative example 1 except that the sintering temperature was set to 1350° C.

The composition of the obtained active material particles was analyzed by ICP analysis. The composition of the active material particles was $TiNb_2O_7$. This composition is represented by the formula $Ti_{1-x}M_xNb_2O_7$, where x=0. This composition can be also represented by the formula $Ti_{1-x}M1_xNb_{2-y}M2_yO_7$, where x=0 and y=0.

Wide-angle X-ray diffraction measurement was performed on the obtained active material particles. The measurement conditions were the same as Example 1. The X-ray diffraction pattern obtained by the measurement is shown in FIG. 20.

Figure 20:
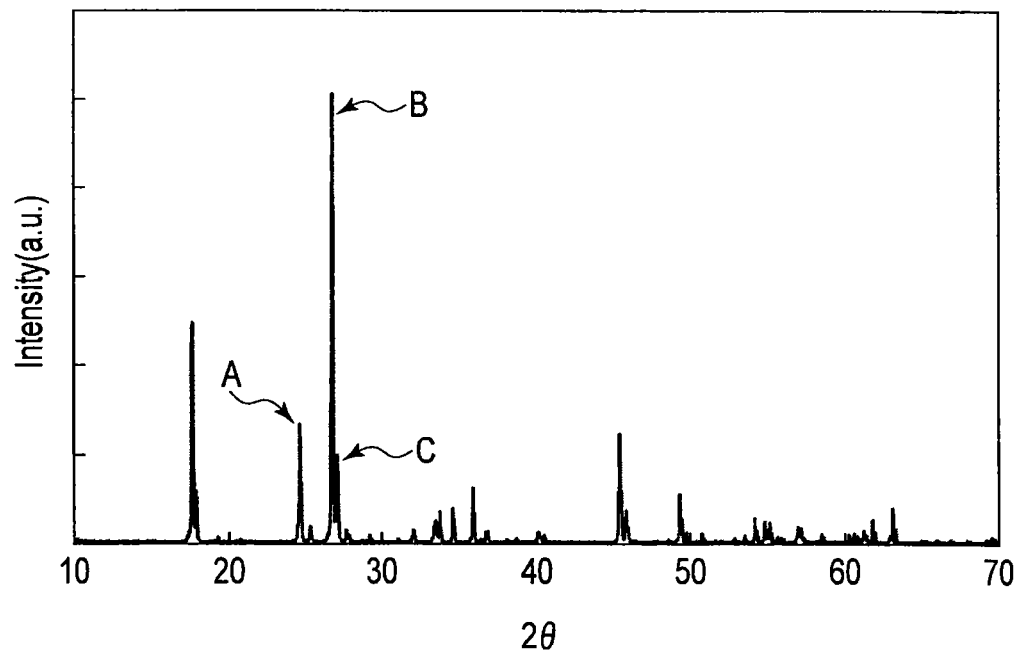
FIG. 20 is a wide-angle X-ray diffraction pattern of active material particles of Comparative example 2.

As shown in FIG. 20, in the diffraction pattern obtained by the wide-angle X-ray diffraction method, the peak A appeared at 2θ=23.96°, the peak B appeared at 2θ=26.03°, and the peak C appeared at 2θ=26.36°. Peak intensity ratios $I_B/I_A$ and $I_C/I_B$ are shown in Table 1 below.

The production method of the electrode and the evaluation method were performed in the same manner as Example 1. The first cycle discharge capacity at 0.2 C per 1 g of the active material particles and the ratio of the discharge capacity at 20 C to the discharge capacity at 0.2 C in Comparative example 2 are shown in Table 1 below.

TABLE 1

| | Composition Of Active Material | Molar ratio (Nb/Ti) at the time of Preparing Raw material | Sintering Temperature and Duration in Sintering Process | Sintering Temperature and Duration in Additional Sintering Process | Coating with Carbon Material | Peak Intensity Ratio $I_B/I_A$ | Peak Intensity Ratio $I_C/I_B$ | First Cycle Discharge Capacity at 0.2 C (mAh/g) | Ratio of Discharge Capacity at 20 C to Discharge Capacity at 0.2 C (%) |
|---|---|---|---|---|---|---|---|---|---|
| Example 1 | $Ti_{0.965}Nb_{2.035}O_7$ | 7:3 | at 1100° C. for 12 hours | at 600° C. for 5 hours | Not Done | 1.00 | 0.74 | 285.2 | 86.5 |
| Example 2 | $Ti_{0.965}Nb_{2.035}O_7$ | 7:3 | at 1100° C. for 12 hours | at 600° C. for 5 hours | Done | 0.92 | 0.80 | 289.1 | 88.7 |
| Example 3 | $Ti_{0.915}Nb_{2.085}O_7$ | 43:17 | at 1100° C. for 12 hours | at 600° C. for 5 hours | Done | 0.81 | 0.72 | 286.5 | 84.2 |
| Example 4 | $TiNb_2O_7$ | 2.21:1 | at 1100° C. for 12 hours | at 600° C. for 5 hours | Done | 1.00 | 0.75 | 282.3 | 86.4 |
| Example 5 | $Ti_{0.965}Nb_{2.035}O_7$ | 7:3 | at 1100° C. for 1 hour | at 600° C. for 5 hours | Done | 1.12 | 0.66 | 301.9 | 91.7 |
| Example 6 | $Ti_{0.965}Nb_{2.035}O_7$ | 7::3 | at 700° C. for 1 hour | at 600° C. for 5 hours | Done | 0.96 | 0.00 | 305.5 | 76.0 |
| Example 7 | $Ti_{0.915}Nb_{2.085}O_7$ | 43:17 | at 1100° C. for 12 hours | at 600° C. for 5 hours | Not Done | 0.88 | 0.72 | 282.1 | 80.5 |
| Example 8 | $TiNb_2O_7$ | 2.21:1 | at 1100° C. for 12 hours | at 600° C. for 5 hours | Not Done | 0.96 | 0.79 | 272.0 | 84.2 |
| Example 9 | $Ti_{0.965}Nb_{2.035}O_7$ | 7:3 | at 1100° C. for 1 hour | at 600° C. for 5 hours | Not Done | 1.00 | 0.70 | 278.0 | 82.1 |
| Example 10 | $Ti_{0.965}Nb_{2.035}O_7$ | 7:3 | at 700° C. for 1 hour | at 600° C. for 5 hours | Not Done | 0.97 | 0.00 | 280.5 | 70.9 |
| Comparative Example 1 | $TiNb_2O_7$ | 2:1 | at 1000° C. for 48 hours | — | Not Done | 0.90 | 0.86 | 276.2 | 80.6 |
| Comparative Example 2 | $TiNb_2O_7$ | 2:1 | at 1350° C. for 24 hours | — | Not Done | 3.78 | 0.19 | 258.2 | 84.8 |

As is clear from Table 1, Examples 1 to 10 were excellent in first cycle discharge capacity as compared to Comparative examples 1 and 2 (high capacity) or had a higher ratio of the discharge capacity at 20 C to the discharge capacity at 0.2 C than that in Comparative examples 1 and 2. This is because, in Examples 1 to 10, thanks to the crystal structure in which the growth was suppressed on the (003) plane and the ($\overline{6}$02) plane where it was difficult to diffuse Li, the diffusion-in-solid of Li ions could be easily performed and the Li ion insertion stability could be improved. In Examples 1 to 10, the growth was suppressed on the (003) plane and the ($\overline{6}$02) plane where it was difficult to diffuse Li. This is based on the fact that, in the X-ray diffraction patterns of Examples 1 to 10, the peak intensity ratio $I_B/I_A$ was within the range of 0.80 to 1.12 and the peak intensity ratio $I_C/I_B$ was 0.80 or less.

From the results shown in Table 1, it is found that Examples 1 to 4 were excellent in first cycle discharge capacity at 0.2 C and the ratio of the discharge capacity at 20 C to the discharge capacity at 0.2 C (i.e., high capacity and excellent rapid charge and discharge characteristics). This is because, in Examples 1 to 4, even if the sintering duration was 12 hours and the additional sintering duration was 5 hours, the growth was suppressed on the (003) plane and the ($\overline{6}$02) plane where it was difficult to diffuse Li and a $Ti_{1-x}Nb_{2+x}O_7$ phase having sufficient crystallinity was obtained. This is based on the fact that, in the X-ray diffraction patterns obtained in Examples 1 to 4, the peak intensity ratio $I_B/I_A$ was within the range of 0.80 to 1.12 and the peak intensity ratio $I_C/I_B$ was 0.80 or less.

On the other hand, in Comparative example 1, the peak intensity ratio $I_C/I_B$ was 0.86, which was greater than 0.80. This means that, in Comparative example 1, the crystal growth on the ($\overline{6}$02) plane is larger than the crystal growth on the (003) plane compared to Examples 1 to 6. This is because the active material particles were synthesized by sintering at 1000° C. for a long time in Comparative example 1, and thus the crystal growth was sufficiently progressed. In Comparative example 1, it was impossible to suppress the crystal growth on the ($\overline{6}$02) plane where it was difficult to diffuse Li. Thus, the first cycle discharge capacity at 0.2 C was 276.2 mAh/g and the rapid charge properties were low.

In Comparative example 2, the peak intensity ratio $I_B/I_A$ was 3.78, which was far greater than 1.12. This means that, in Comparative example 2, the crystal growth on the (003) plane is larger than the crystal growth on the (110) plane compared to Examples 1 to 6. This is because high temperature sintering at 1200° C. or more resulted in anisotropic growth of crystals in Comparative example 2, and thus a high peak in the (003) plane appeared. In Comparative example 2, it was impossible to suppress the crystal growth on the (003) plane where it was difficult to diffuse Li. Thus, the first cycle discharge capacity at 0.2 C was 58.20 mAh/g and the capacity was low.

Example 2 had characteristics improved as compared to those of Example 1. Similarly, Example 3 had characteristics improved as compared to those of Example 7. Example 4 had characteristics improved as compared to those of Example 8. Further, Example 5 had characteristics improved as compared to those of Example 9. Example 6 had characteristics improved as compared to those of Example 10. This is because, in Examples 2, 3, 4, 5, and 6, the electron conductivity of the active material was improved by coating with carbon.

In Examples 2 to 4, active material particles in which the value of x was changed in the formula: $Ti_{1-x}M_xNb_2O_7$ (wherein M=Nb) was used. In other word, in Examples 2 to 4, active material particles in which the value of x was changed in the formula: $Ti_{1-x}M1_xNb_{2-y}M2_yO_7$ (wherein M=Nb, y=0). However, if the wide-angle X-ray diffraction patterns obtained in Examples 1 to 4 were compared, the formation of a different phase was not observed. From this result, it is inferred that in Examples 2 to 4, the site of the Ti element in the active material particles of Example 1 is substituted by the Nb element. Furthermore, it is found that when the active material particles having the composition represented by the formula: $Ti_{1-x}M_xNb_2O_7$ (wherein M=Nb and x=0.035) were used, the highest capacity was obtained.

In Example 5, the sintering duration was reduced and thus the peak intensity ratio $I_C/I_B$ became low. As a result, Example 5 showed improved characteristics as compared to those of Example 2 (i.e., high capacity and excellent rapid charge and discharge characteristics).

Since the sintering was performed at a low temperature (700° C.) in Example 6, the peak in the diffraction pattern was broad compared to Examples 1 to 5 as shown in FIG. 13. This shows that the crystallinity was reduced in Example 6. Since the crystallinity was low, Example 6 had a lower ratio of the discharge capacity at 20 C to the discharge capacity at 0.2 C than that in Examples 1 to 5. However, in Example 6, the peak intensity ratio $I_C/I_B$ was lower than that of Example 5. Thanks to this, the first cycle discharge capacity in Example 6 became the highest among all the examples.

Example 11

Active material particles were synthesized in the same manner as Example 5 except that a solution of iron nitrate in ethanol, a solution of titanyl sulfate in diluted sulfuric acid, and a solution of niobium chloride in ethanol were used as starting materials and the composition ratio of the mixed solution was changed in this example.

The crystal structure of the precursor particles before subjecting to sintering was confirmed using the X-ray diffraction measurement. As a result, it was found that the halo peak in the precursor was observed and they were in an amorphous state.

The composition of the active material particles was changed by mixing a solution of titanyl sulfate in diluted sulfuric acid and a solution of niobium chloride in ethanol as starting materials so that the molar ratio (Nb/Ti) was 12:5 and adding a small amount of a solution of iron nitrate in ethanol thereto.

The composition of the obtained active material particles was analyzed by ICP analysis. The composition of the active material particles was $Ti_{0.93}Fe_{0.05}Nb_{2.02}O_7$. This composition is represented by the formula: $Ti_{1-x}M_xNb_2O_7$, where Ma=Fe, xa=0.05, Mb=Nb, xb=0.02, and x=xa+xb=0.07. This composition can be also represented by the formula: $Ti_{1-x}M1_xNb_{2-y}M2_yO_7$, where M1a=Fe, xa=0.05, M1b=Nb, xb=0.02, x=xa+xb=0.07, and y=0.

Wide-angle X-ray diffraction measurement was performed on the obtained active material. In the diffraction pattern obtained by the wide-angle X-ray diffraction method, the peak A appeared at 2θ=24.02°, the peak B appeared at 2θ=26.05°, and the peak C appeared at 2θ=26.38°. Peak intensity ratios $I_B/I_A$ and $I_C/I_B$ are shown in Table 2 below.

The production method and evaluation method of the electrodes were performed in the same manner as Example 1. The first cycle discharge capacity at 0.2 C per 1 g of the active material and the ratio of the discharge capacity at 20 C to the discharge capacity at 0.2 C in Example 11 are shown in Table 2 below.

Example 12

Active material particles were synthesized in the same manner as Example 5 except that a solution of tantalum chloride in ethanol, a solution of titanyl sulfate in diluted sulfuric acid, and a solution of niobium chloride in ethanol were used as starting materials and the composition ratio of the mixed solution was changed in this example.

The crystal structure of the precursor particles before subjecting to sintering was confirmed using the X-ray diffraction measurement. As a result, it was found that the halo peak was observed in the precursor and it was in an amorphous state.

The composition of the active material particles was changed by mixing a solution of titanyl sulfate in diluted sulfuric acid and a solution of niobium chloride in ethanol as starting materials so that the molar ratio (Nb/Ti) was 9:4 and adding a small amount of a solution of tantalum chloride in ethanol thereto.

The composition of the obtained active material particles was analyzed by ICP analysis. The composition of the active material particles was $Ti_{0.97}Ta_{0.05}Nb_{1.98}O_7$. This composition is represented by the formula: $Ti_{1-x}M1_xNb_{2-y}M2_yO_7$, where M1=Ta, x=0.03, M2=Ta, and y=0.02.

Wide-angle X-ray diffraction measurement was performed on the obtained active material. In the diffraction pattern obtained by the wide-angle X-ray diffraction method, the peak A appeared at 2θ=24.02°, the peak B appeared at 2θ=26.05°, and the peak C appeared at 2θ=26.38°. Peak intensity ratios $I_B/I_A$ and $I_C/I_B$ are shown in Table 2 below.

The production method and evaluation method of the electrodes were performed in the same manner as Example 1. The first cycle discharge capacity at 0.2 C per 1 g of the active material and the ratio of the discharge capacity at 20 C to the discharge capacity at 0.2 C in Example 12 are shown in Table 2 below.

Example 13

Active material particles were synthesized in the same manner as Example 5 except that a solution of molybdenum chloride in ethanol, a solution of titanyl sulfate in diluted sulfuric acid, and a solution of niobium chloride in ethanol were used as starting materials and the composition ratio of the mixed solution was changed in this example.

The crystal structure of the precursor particles before subjecting to sintering was confirmed using the X-ray diffraction measurement. As a result, it was found that the halo peak was observed in the precursor and it was in an amorphous state.

The composition of the active material particles was changed by mixing a solution of titanyl sulfate in diluted sulfuric acid and a solution of niobium chloride in ethanol as starting materials so that the molar ratio (Nb/Ti) was 21:10 and adding a small amount of a solution of molybdenum chloride in ethanol thereto.

The composition of the obtained active material particles was analyzed by ICP analysis. The composition of the active material particles was $Ti_{1.02}Mo_{0.05}Nb_{1.93}O_7$. This composition is represented by the formula: $Ti_{1-x}M1_xNb_{2-y}M2_yO_7$, where x=0, M2a=Ti, ya=0.02, M2b=Mo, yb=0.05, and y=ya+yb=0.07.

Wide-angle X-ray diffraction measurement was performed on the obtained active material. In the diffraction pattern obtained by the wide-angle X-ray diffraction method, the peak A appeared at 2θ=24.02°, the peak B appeared at 2θ=26.05°, and the peak C appeared at 2θ=26.38°. Peak intensity ratios $I_B/I_A$ and $I_C/I_B$ are shown in Table 2 below.

The production method and evaluation method of the electrodes were performed in the same manner as Example 1. The first cycle discharge capacity at 0.2 C per 1 g of the active material and the ratio of the discharge capacity at 20 C to the discharge capacity at 0.2 C in Example 13 are shown in Table 2 below.

Example 14

Active material particles were synthesized in the same manner as Example 5 except that a solution of vanadium chloride in ethanol, a solution of titanyl sulfate in diluted sulfuric acid, and a solution of niobium chloride in ethanol were used as starting materials and the composition ratio of the mixed solution was changed in this example.

The crystal structure of the precursor particles before subjecting to sintering was confirmed using the X-ray diffraction measurement. As a result, it was found that the halo peak was observed in the precursor and it was in an amorphous state.

The composition of the active material particles was changed by mixing a solution of titanyl sulfate in diluted sulfuric acid and a solution of niobium chloride in ethanol as starting materials so that the molar ratio (Nb/Ti) was 9:4 and adding a small amount of an ethanol solution of vanadium chloride thereto.

The composition of the obtained active material particles was analyzed by ICP analysis. The composition of the active material particles was $Ti_{0.97}V_{0.05}Nb_{1.98}O_7$. This composition is represented by the formula: $Ti_{1-x}M1_xNb_{2-y}M2_yO_7$, where M1=V, x=0.03, M2=V, and y=0.02.

Wide-angle X-ray diffraction measurement was performed on the obtained active material. In the diffraction pattern obtained by the wide-angle X-ray diffraction method, the peak A appeared at 2θ=24.02°, the peak B appeared at 2θ=26.05°, and the peak C appeared at 2θ=26.38°. Peak intensity ratios $I_B/I_A$ and $I_C/I_B$ are shown in Table 2 below.

The production method and evaluation method of the electrodes were performed in the same manner as Example 1. The first cycle discharge capacity at 0.2 C per 1 g of the active material and the ratio of the discharge capacity at 20 C to the discharge capacity at 0.2 C in Example 14 are shown in Table 2 below.

(Evaluation)

Examples 11 to 14 show the results when the kind and/or the amount of the element M1 and/or the element M2 in $Ti_{1-x}M1_xNb_{2-y}M2_yO_7$ were changed in the experimental method and the evaluation method similarly to Example 5. The results of Table 2 show that the ratio of the discharge capacity at 20 C to the discharge capacity at 0.2 C in Examples 11 to 14 is improved as compared to that in Example 5. This is assumed to be due to the fact that the electronic conductivity of the active material is improved by substituting a part of the element Ti and/or the element Nb for the elements M1 and M2 having different valences. Further, it is found that, in Example 13 in which Mo element of Example 13 was used as a substituted element and Example 14 in which V element was used as a substituted element, each of a raw material including Mo and a raw material including V functions as sintering aids, and thus the same or higher characteristics are obtained even under the sintering conditions (at 900° C. for 1 hour).

(Evaluation of Capacity-Retention Ratio)

Another three-electrode-type beaker cell was produced by the above-described procedure using the active material obtained in Example 1. The cell was subjected to a cycle test at a charge/discharge current of 1 C in which the cut-off potential was from 1.2 to 2.0 V. The cycle number was 500 and the evaluation temperature in the cycle test was 25° C. The capacity after the first cycle and the capacity after 500 cycles were measured. The capacity after 500 cycles relative to the capacity after the first cycle is defined as the capacity-retention ratio (%). The capacity-retention ratio after 500 cycles in Example 1 was 76.8%.

The active materials obtained in Examples 2 to 14 and Comparative examples 1 to 2 were subjected to the cycle test in the same manner as Example 1. The results are shown in Table 3 below.

TABLE 3

|  | Discharge-Capacity Retention Ratio after 500 Cycles (%) |
| --- | --- |
| Example 1 | 76.8 |
| Example 2 | 85.6 |
| Example 3 | 86.2 |
| Example 4 | 81.1 |
| Example 5 | 91.8 |
| Example 6 | 93.6 |
| Example 7 | 77.3 |

TABLE 2

| | Composition Of Active Material | Molar ratio (Nb/Ti) at the time of Preparing Raw material | Sintering Temperature and Duration in Sintering Process | Sintering Temperature and Duration in Additional Sintering Process | Coating with Carbon Material | Peak Intensity Ratio $I_B/I_A$ | Peak Intensity Ratio $I_C/I_B$ | First Cycle Discharge Capacity at 0.2 C (mAh/g) | Ratio of Discharge Capacity at 20 C to Discharge Capacity at 0.2 C (%) |
| --- | --- | --- | --- | --- | --- | --- | --- | --- | --- |
| Example 11 | $Ti_{0.93}Fe_{0.05}Nb_{2.02}O_7$ | 12:5 | at 1100° C. for 1 hour | at 600° C. for 5 hours | Done | 0.85 | 0.71 | 296.3 | 94.1 |
| Example 12 | $Ti_{0.97}Ta_{0.05}Nb_{1.98}O_7$ | 9:4 | at 1100° C. for 1 hour | at 600° C. for 5 hours | Done | 1.06 | 0.73 | 295.7 | 92.8 |
| Example 13 | $Ti_{1.02}Mo_{0.05}Nb_{1.93}O_7$ | 21:10 | at 900° C. for 1 hour | at 600° C. for 5 hours | Done | 1.03 | 0.73 | 296.4 | 94.2 |
| Example 14 | $Ti_{0.97}V_{0.05}Nb_{1.98}O_7$ | 9:4 | at 900° C. for 1 hour | at 600° C. for 5 hours | Done | 1.08 | 0.75 | 297.1 | 93.6 |

TABLE 3-continued

| | Discharge-Capacity Retention Ratio after 500 Cycles (%) |
|---|---|
| Example 8 | 70.1 |
| Example 9 | 75.8 |
| Example 10 | 78.9 |
| Example 11 | 93.1 |
| Example 12 | 92.3 |
| Example 13 | 94.7 |
| Example 14 | 94.5 |
| Comparative Example 1 | 51.8 |
| Comparative Example 2 | 64.3 |

The results of Table 3 show that an excellent capacity-retention ratio after 500 cycles was achieved in the cases of the active materials obtained in Examples 1 to 14 as compared to the cases of the active materials obtained in Comparative examples 1 and 2. This is because the volume expansion and shrinkage due to the charge and discharge was reduced in the cases of the active materials obtained in Examples 1 to 14 as compared to the cases of the active materials obtained in Comparative examples 1 and 2, and thus conduction path breakage during the charge-and-discharge cycles was suppressed. Further, the primary particle diameters thereof were smaller than those of the active materials obtained in Comparative examples 1 and 2. This is considered to be the reason why the change in the volume was reduced in the cases of the active materials obtained in Examples 1 to 14.

Further, the results of Table 3 show that the capacity-retention ratio after the cycles in Examples 11 to 14 is improved as compared to that in Example 5. This is assumed to be due to the fact that the electronic conductivity of the active material was improved by substituting a part of the element Ti and/or the element Nb for the elements M1 and M2 having different valences. Further, it is found that, in Example 13 in which Mo element was used as a substituted element and in Example 14 in which V element is used as a substituted element, each of a raw material including Mo and a raw material including V functioned as sintering aids, and thus the same or higher characteristics were obtained even under the sintering conditions (at 900° C. for 1 hour).

The active substance for a battery according to at least one of the embodiments and examples includes active material particles which contain the compound represented by the formula: $Ti_{1-x}M1_xNb_{2-y}M2_yO_7$ ($0 \leq x < 1$, $0 \leq y < 1$). In the active material particles, the intensity $I_A$ of the peak A attributed to the (110) plane, the intensity $I_B$ of the peak B attributed to the (003) plane, and the intensity $I_C$ of the peak C attributed to the ($\overline{6}02$) plane satisfy the following relation (1): $0.80 \leq I_B/I_A \leq 1.12$ and relation (2): $I_C/I_B \leq 0.80$. The active substance for a battery has the crystal structure in which the growth is suppressed on the (003) plane and the ($\overline{6}02$) plane where it is difficult to diffuse Li. Thus, the diffusion-in-solid of Li ions can be easily performed and the Li ion insertion stability can be improved. Thus, the nonaqueous electrolyte battery which includes the active material for batteries according to the first embodiment can exhibit a high capacity and improved rapid charge and discharge characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active substance comprising:
   active material particles which comprise a compound represented by a formula: $Ti_{1-x}M1_xNb_{2-y}M2_yO_7$, wherein $0 \leq x < 1$, $0 \leq y < 1$ and each of an element M1 and an element M2 is at least one selected from the group consisting of Nb, V, Ta, Fe, Ti, Bi, Sb, As, P, Cr, Mo, W, B, Na, Mg, Al, and Si, and the element M1 and the element M2 are identical or different from each other, and in which the active material particles have a peak A attributed to a (110) plane which appears at 2θ ranging from 23.74 to 24.14°, a peak B attributed to a (003) plane which appears at 2θ ranging from 25.81 to 26.16°, and a peak C attributed to a ($\overline{6}02$) plane which appears at 2θ ranging from 26.31 to 26.54° in an X-ray diffraction pattern of the active material particles obtained by the X-ray diffraction method using Cu—Kα rays, and an intensity $I_A$ of the peak A, an intensity $I_B$ of the peak B, and an intensity $I_C$ of the peak C satisfy the following relations (1) and (2):

$$0.80 \leq I_B/I_A \leq 1.12 \qquad (1); \text{ and}$$

$$I_C/I_B \leq 0.75 \qquad (2),$$

wherein the precursor particles for making the active material particles are in an amorphous state in which Nb and Ti are mixed at the atomic level.

2. The active substance according to claim 1, further comprising a carbon material.

3. The active substance according to claim 2, wherein at least a part of a surface of the active material particles is covered with the carbon material.

4. A nonaqueous electrolyte battery, comprising:
   a negative electrode comprising the active substance according to claim 1;
   a positive electrode; and
   a nonaqueous electrolyte.

5. A battery pack comprising the nonaqueous electrolyte battery according to claim 4.

6. The battery pack according to claim 5, comprising a plurality of the nonaqueous electrolyte batteries.

7. The battery pack according to claim 6, wherein the plurality of the nonaqueous electrolyte batteries are electrically connected to each other in series, in parallel or in a combination thereof.

8. The battery pack according to claim 5, further comprising:
   a protective circuit configured to detect a voltage of the nonaqueous electrolyte battery.

9. The active substance according to claim 1, wherein the intensity $I_B$ of the peak B and the intensity $I_C$ of the peak C satisfy the following relation:

$$0.6 \leq I_C/I_B \leq 0.75.$$

10. The active substance according to claim 1, wherein the intensity $I_A$ of the peak A and the intensity $I_B$ of the peak B satisfy the following relation:

$$0.9 \leq I_B/I_A \leq 1.1.$$

11. The active substance according to claim 1, wherein the active material particles have a crystal structure having symmetry of space group C2/m.

12. The active substance according to claim 1, wherein the active substance has a primary particle size of from 0.01 μm to 10 μm.

13. The active substance according to claim 1, wherein the active substance has a 0.1 m$^2$/g or more but less than 50 m$^2$/g.

14. The active substance according to claim 1, wherein the active substance is granulated.

15. The active substance according to claim 1, wherein the active substance is for a nonaqueous electrolyte battery.

16. The active substance according to claim 1,
wherein the element M2 is at least one selected from the group consisting of V, Ta, Fe, Ti, Bi, Sb, As, P, Cr, Mo, W, B, Na, Mg, Al, and Si, and
wherein 0<y<1.

17. The active substance according to claim 1,
Wherein the element M2 is at least one selected from the group consisting of V, Ta, Fe, Ti, Bi, Sb, As, P, Cr, Mo, W, B, Na, Mg, Al, and Si, and
wherein 0.02<y<1.

18. The active substance according to claim 1, wherein the intensity $I_B$ of the peak B and the intensity $I_C$ of the peak C satisfies the following relating:

$$I_C/I_B \leq 0.66.$$

19. The active substance according to claim 2, wherein an amount of the carbon material is from 0.5 wt % to 20 wt % based on a total weight of the active substance.

20. The active substance according to claim 1, wherein each of the element M1 and the element M2 is at least one selected from the group consisting of Fe, Sb, As, P, Cr, Mo, W, B, Na, Mg, and Al, and the element M1 and the element M2 are identical or different from each other, and
wherein 0<x<1 or 0<y<1.

21. The active substance according to claim 1, wherein the element M1 is Fe, and wherein 0<x<1.

22. The active substance according to claim 1, wherein the element M2 is at least one selected from the group consisting of Mo and W, and wherein 0<y<1.

23. The active substance according to claim 1, wherein M1 is Nb and M2 is P.

\* \* \* \* \*